US010447991B1

(12) United States Patent
Zweigle et al.

(10) Patent No.: US 10,447,991 B1
(45) Date of Patent: Oct. 15, 2019

(54) SYSTEM AND METHOD OF MAPPING ELEMENTS INSIDE WALLS

(71) Applicant: FARO Technologies, Inc., Lake Mary, FL (US)

(72) Inventors: Oliver Zweigle, Stuttgart (DE); Ahmad Ramadneh, Kornwestheim (DE); Aleksej Frank, Stuttgart (DE); João Santos, Kornwestheim (DE)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 0 days.

(21) Appl. No.: 16/009,383

(22) Filed: Jun. 15, 2018

(51) Int. Cl.
| | |
|---|---|
| *H04N 13/221* | (2018.01) |
| *H04N 13/254* | (2018.01) |
| *H04N 13/324* | (2018.01) |
| *G01C 21/16* | (2006.01) |
| *H04N 13/271* | (2018.01) |

(52) U.S. Cl.
CPC .......... *H04N 13/221* (2018.05); *G01C 21/16* (2013.01); *H04N 13/254* (2018.05); *H04N 13/271* (2018.05); *H04N 13/324* (2018.05); *H04N 2213/001* (2013.01)

(58) Field of Classification Search
None
See application file for complete search history.

(56) References Cited

U.S. PATENT DOCUMENTS

2013/0215235 A1\* 8/2013 Russell .................. G03B 35/00
348/47

OTHER PUBLICATIONS

Censi, A., "An ICP variant using a point-to-line metric," IEEE International Conference on Robotics and Automation (ICRA) 2008. 7 pages.

\* cited by examiner

*Primary Examiner* — Christopher Braniff
(74) *Attorney, Agent, or Firm* — Cantor Colburn LLP

(57) ABSTRACT

According to one or more embodiments, a system of generating a two-dimensional (2D) map of an environment includes a 2D scanner and a wall sensor positioned at a fixed position with respect to the 2D scanner, the wall sensor detects a presence of an internal element inside a wall in the environment. Further, the system includes one or more processors operably coupled to the 2D scanner and the wall sensor. The processors generate a wall map of a wall in the environment, the wall map including an occupancy grid with a plurality of cells, a cell representative of a corresponding portion of the wall, and the cell indicative of the occupancy of an internal element in the corresponding portion. Further, the processors associate the wall map with a location of the wall in the 2D map of the environment.

28 Claims, 19 Drawing Sheets

SYSTEM AND METHOD OF MAPPING ELEMENTS INSIDE WALLS

BACKGROUND

The present application is directed to enhancing on-site documentation of an environment through mapping elements inside walls.

The automated creation of digital two-dimensional floorplans for existing structures is desirable as it allows the size and shape of the environment to be used in many processes. For example, a floorplan may be desirable to allow construction drawings to be prepared during a renovation. Such floorplans may find other uses such as in documenting a building for a fire department or to document a crime scene.

Existing measurement systems typically use a scanning device that determines coordinates of surfaces in the environment either, by emitting a light and capturing a reflection to determine a distance, or by triangulation using cameras. These scanning device are mounted to a movable structure, such as a cart, and moved through the building to generate a digital representation of the building. These systems tend to be more complex and require specialized personnel to perform the scan. Further, the scanning equipment including the movable structure may be bulky, which could further delay the scanning process in time sensitive situations, such as a crime or accident scene investigation.

Accordingly, while existing scanners are suitable for their intended purposes, what is needed is a system for having certain features of embodiments of the present invention.

BRIEF DESCRIPTION

According to one or more embodiments, a system of generating a two-dimensional (2D) map of an environment includes a housing having a body and a handle, the housing being sized to be carried by a single person during operation, the body having a first plane extending therethrough. The system further includes a 2D scanner disposed in the body and having a light source, an image sensor and a controller, the light source steers a beam of light within the first plane to illuminate object points in the environment, the image sensor is arranged to receive light reflected from the object points, the controller being operable to determine a first distance value to at least one of the object points. The system further includes a wall sensor positioned at a fixed position with respect to the 2D scanner, the wall sensor detects a presence of an internal element inside a wall in the environment. The system further includes one or more processors operably coupled to the 2D scanner and the wall sensor, the one or more processors being responsive to executable instructions for generating a 2D map of the environment. The processors generate a wall map of the wall in the environment, the wall map comprising an occupancy grid with a plurality of cells, a cell representative of a corresponding portion of the wall, and the cell indicative of the occupancy of the internal element in the corresponding portion. The processors further associate the wall map with a location of the wall in the 2D map of the environment.

According to one or more embodiments, a method for generating a two-dimensional (2D) image of an environment includes obtaining, a 2D scan set comprising 2D coordinates of points in the environment. The method further includes mapping, by a processor, an occupancy grid with a wall in the environment, the occupancy grid comprising a plurality of cells that are mapped with corresponding portions of the wall. The method further includes determining, by a wall sensor, a portion of the wall that includes an internal element. The method further includes displaying, on a display device, the occupancy grid with the cell corresponding to the portion being marked to indicate a presence of the internal element in the portion. The method further includes generating a 2D map of the environment using the 2D scan set and the occupancy grid.

According to one or more embodiments, a system of generating a two-dimensional (2D) map of an environment includes a mobile computing device having a depth camera. The system further includes a wall sensor operably coupled to the mobile computing device and positioned at a fixed position with respect to the depth camera, the wall sensor detects a presence of an internal element inside a wall in the environment. The system further includes one or more processors operably coupled to the mobile computing device and the wall sensor, the one or more processors being responsive to executable instructions for generating a 2D map of the environment. The one or more processors generate a wall map of the wall in the environment, the wall map includes an occupancy grid with a plurality of cells, a cell representative of a corresponding portion of the wall, and the cell indicative of the occupancy of the internal element in the corresponding portion. Further, the processors associate the wall map with a location of the wall in the 2D map of the environment.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
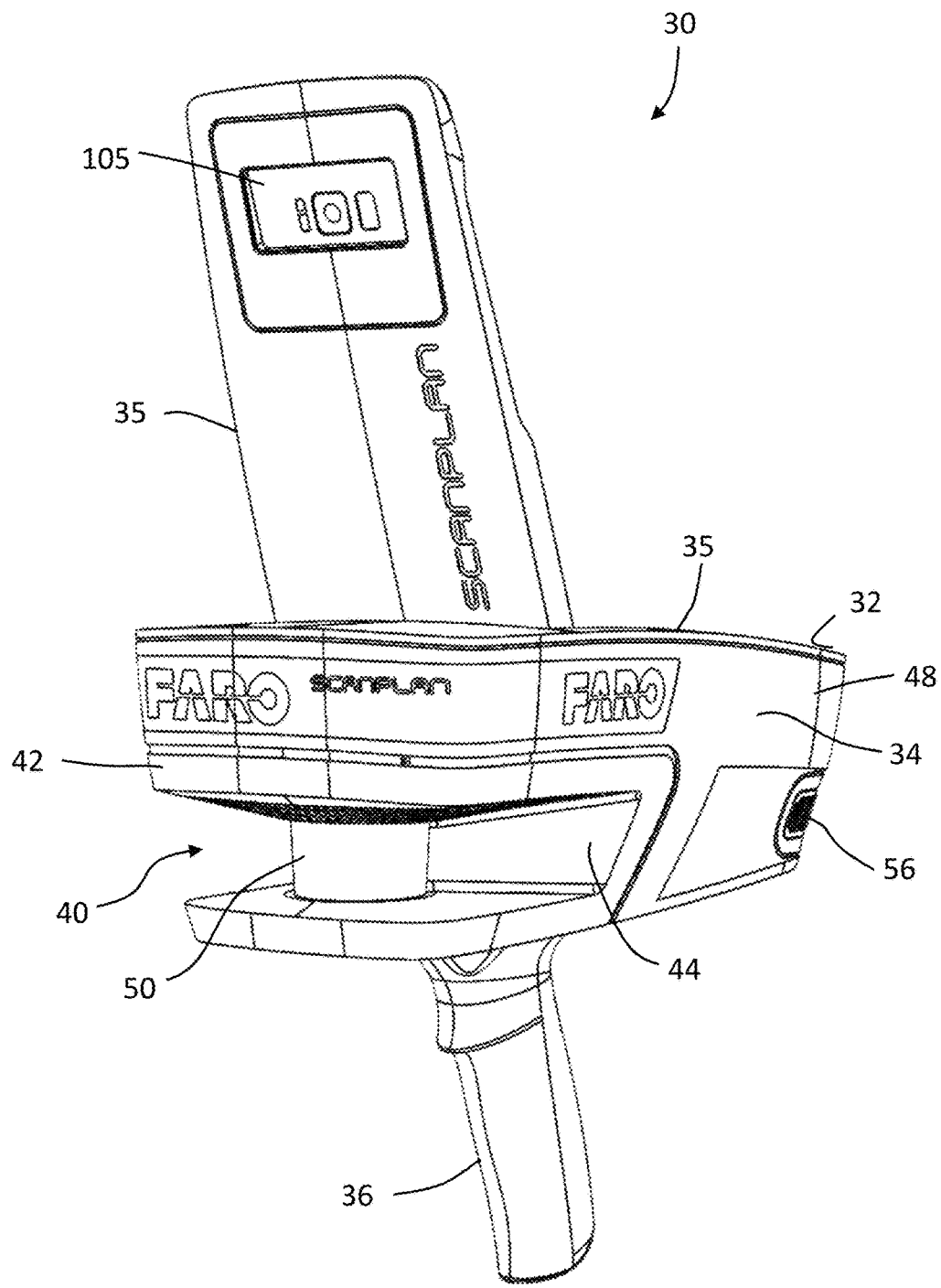
FIGS. 1-3 are perspective views of a scanning and mapping system in accordance with an embodiment.
Figure 2:
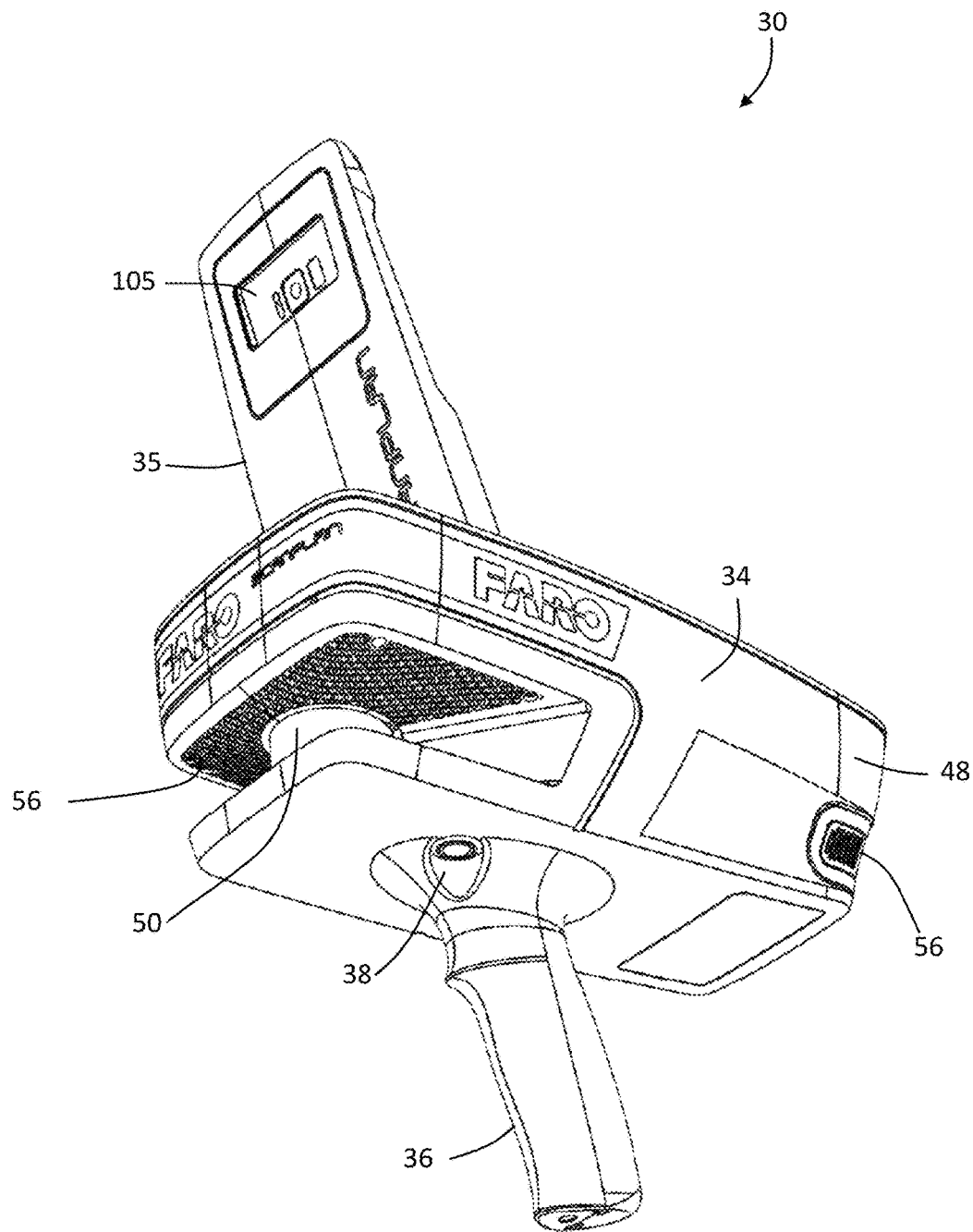
Figure 3:
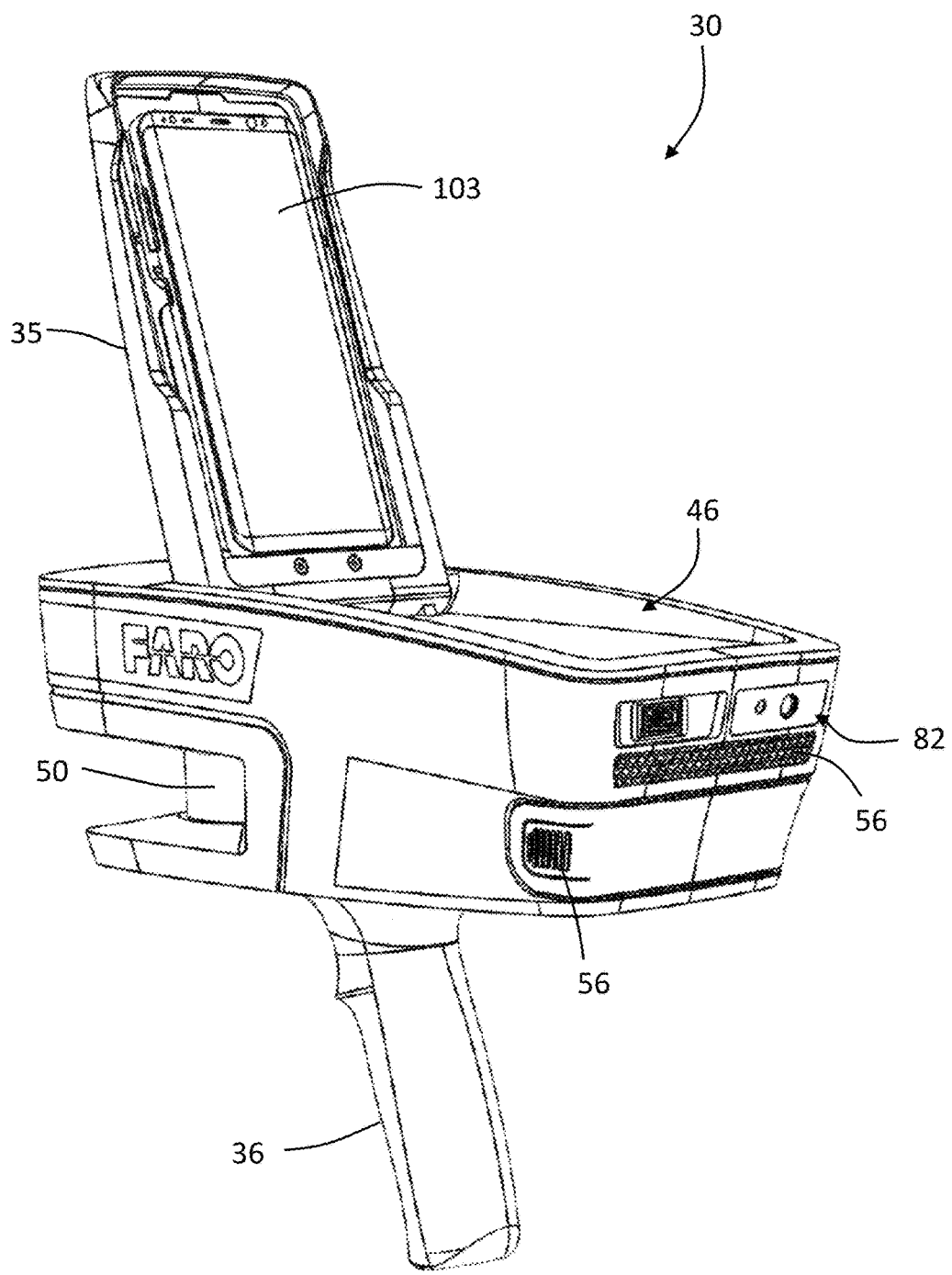
Figure 4:
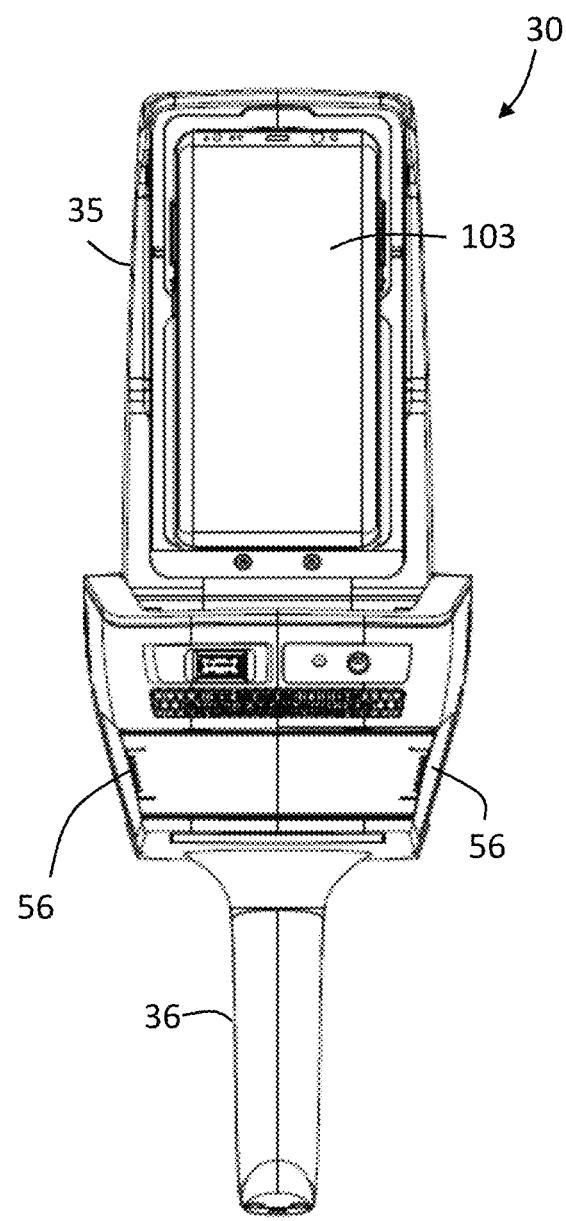
FIG. 4 is a first end view of the system of FIG. 1.
Figure 5:
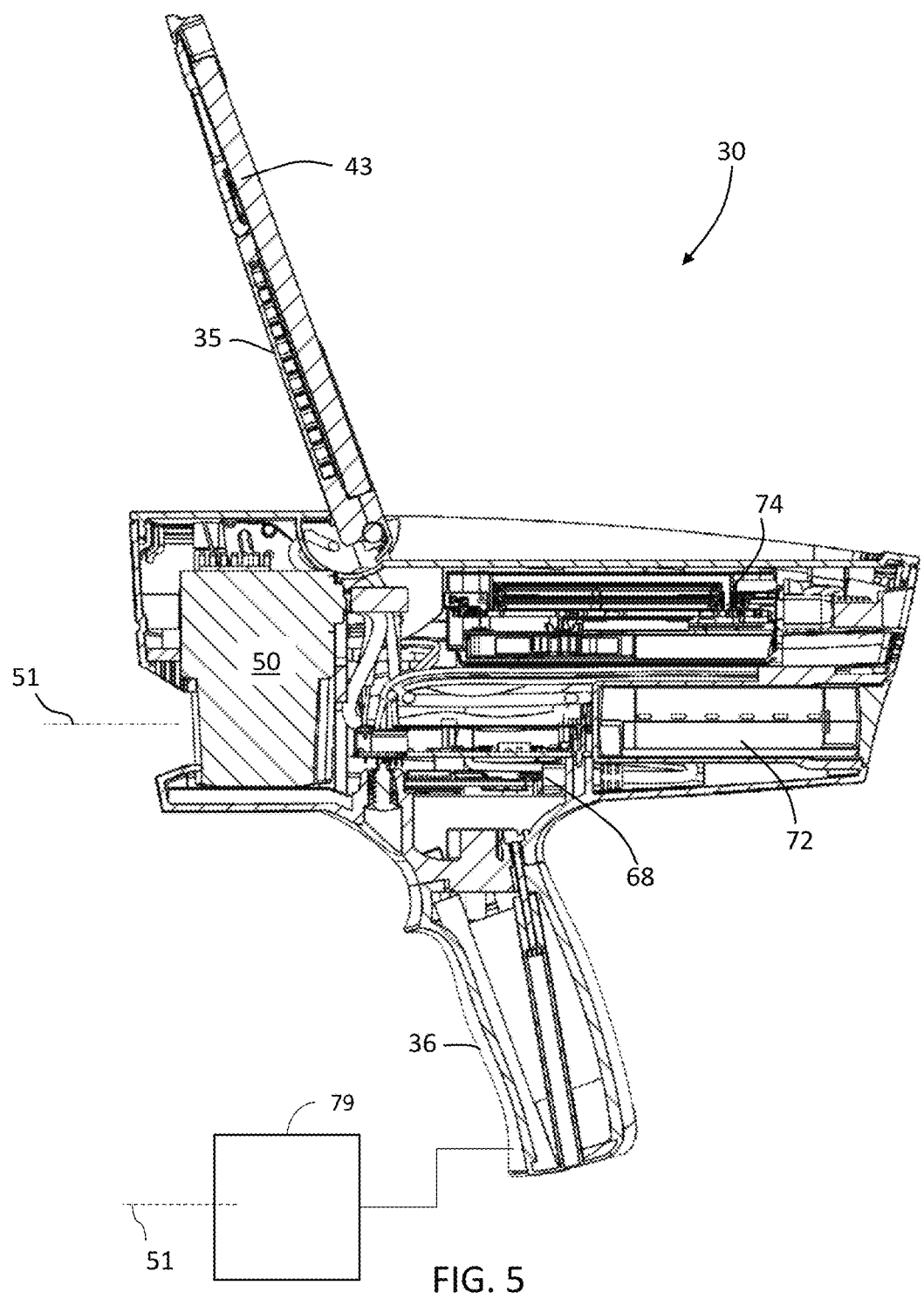
FIG. 5 is a side sectional view of the system of FIG. 1.
Figure 6:
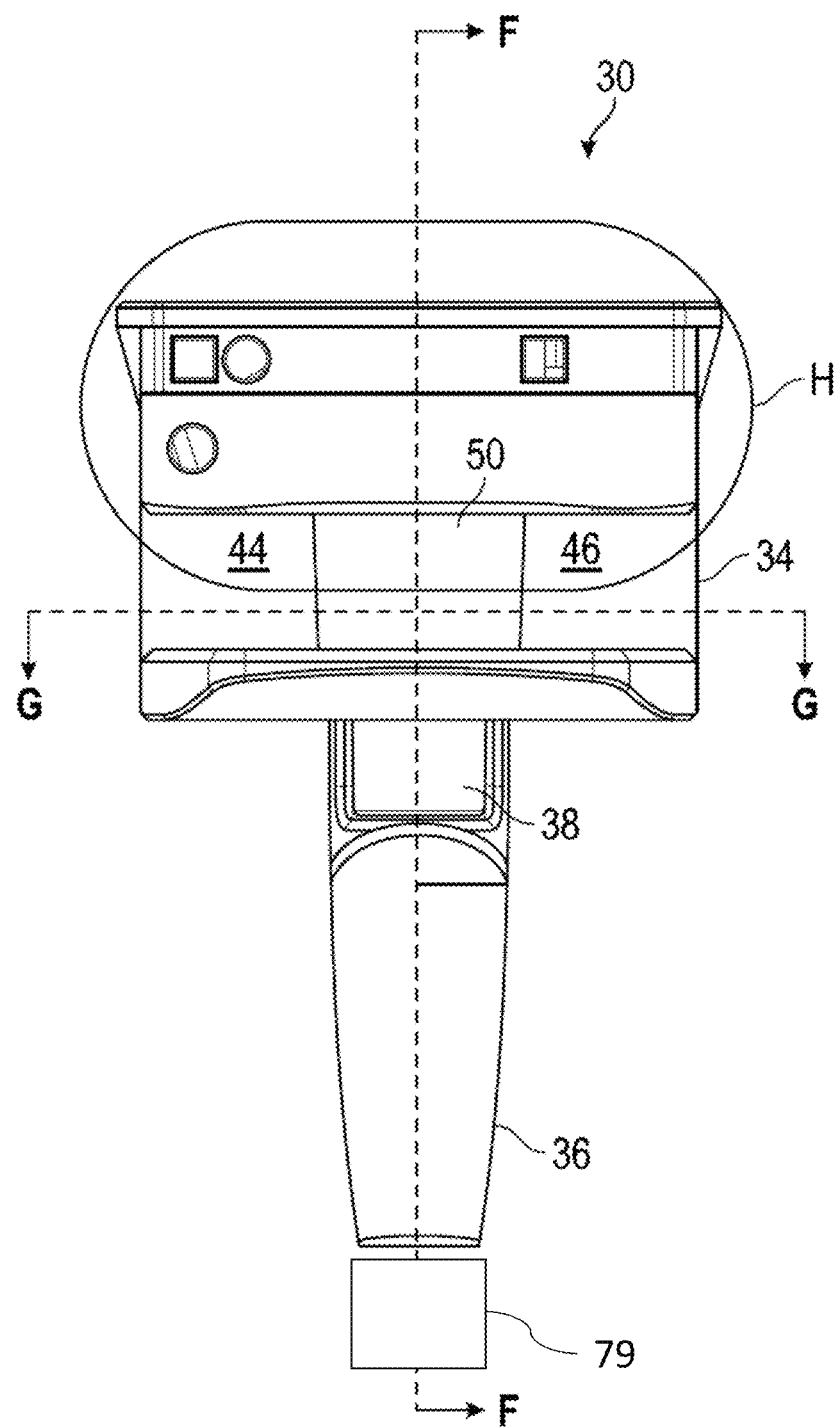
FIG. 6 is a second end view of the system of FIG. 1.
Figure 7:
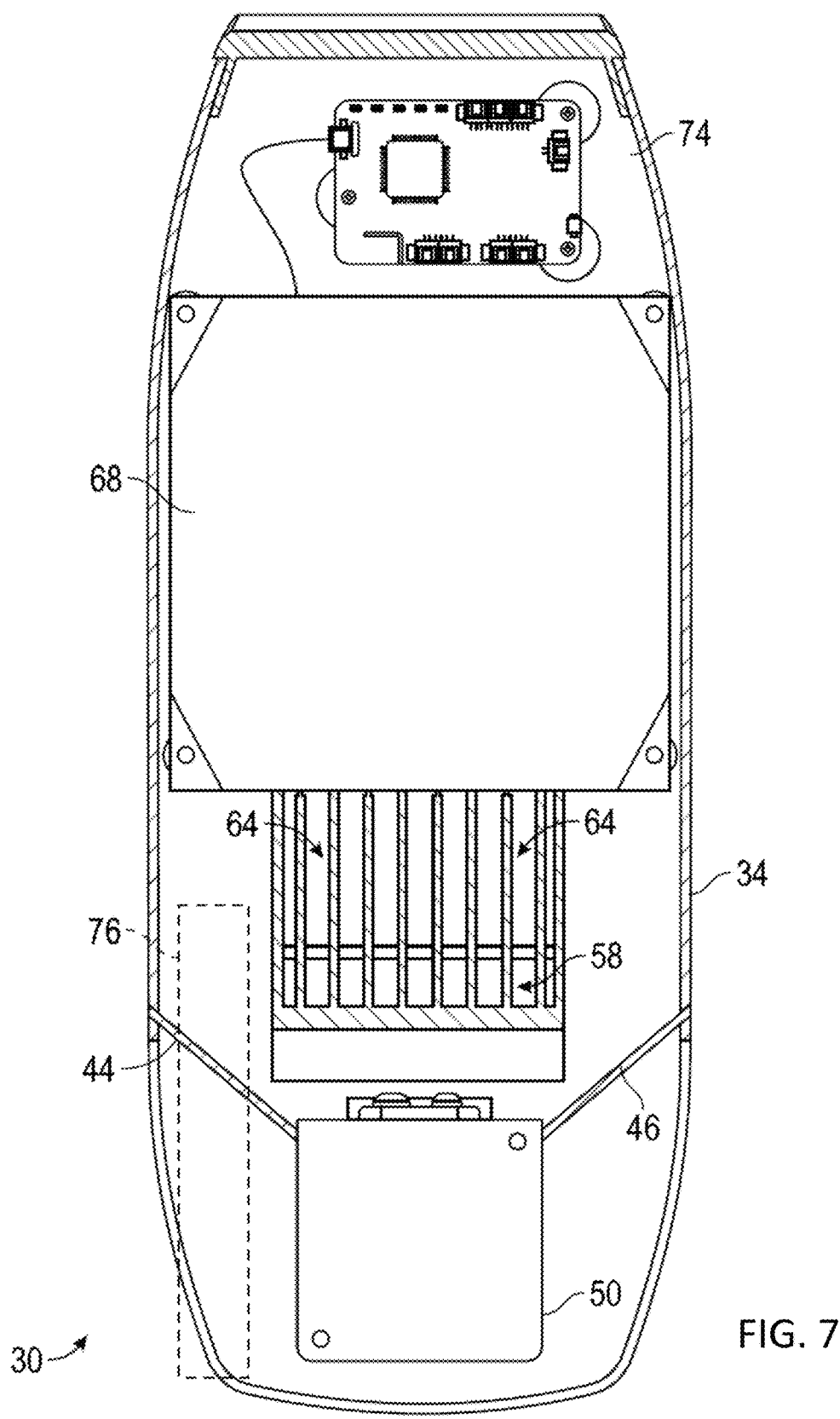
FIG. 7 is a top sectional view of the system of FIG. 1
Figure 8:
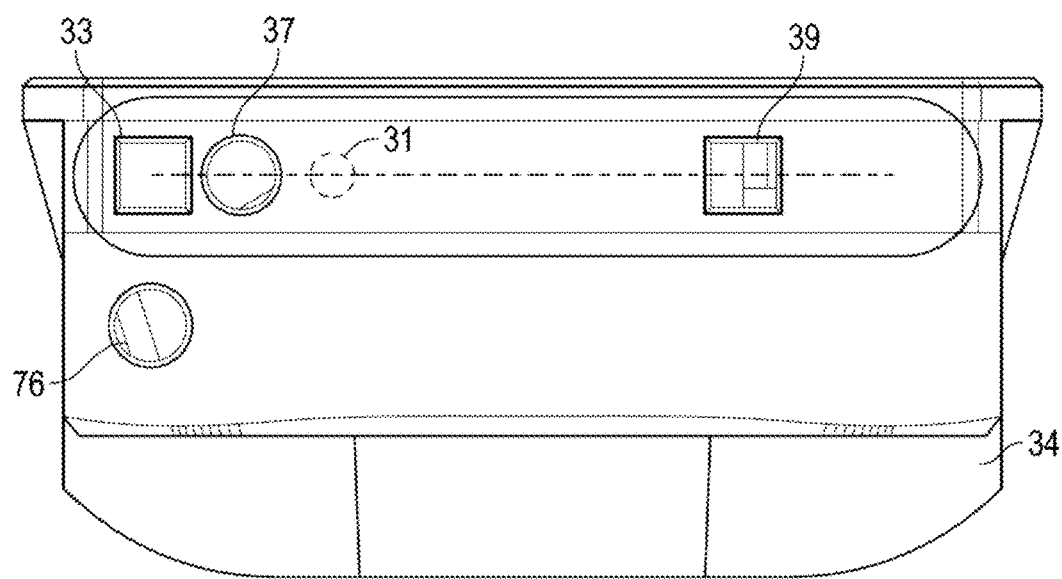
FIG. 8 is an enlarged view of a portion of the second end of FIG. 6.

The one or more embodiments of the present invention relate to a device that includes a system having a 2D scanner that works cooperatively with an inertial measurement unit to generate an annotated two-dimensional map (2D map) of an environment. Further, the one or more embodiments the system enhances the 2D map with additional information about on-site documentation (e.g. 2D floor plans) during the creation as an overlay for providing an augmented reality map. In one or more examples, the augmented reality map can be viewed and/or interacted with via a computing device such as a mobile phone, a tablet computer, media device, or any other such computing devices. Further, in one or more examples, the augmented reality map can be viewed and/or interacted with via a mixed reality device, or virtual reality device like HOLOLENS™, VIVE™, OCULUS™, and the like.

Referring now to FIGS. 1-8, an embodiment of a measurement system 30 having a housing 32 that includes a body portion 34 and a handle portion 36. The handle 36 may include an actuator 38 that allows the operator to interact with the system 30. In the exemplary embodiment, the body 34 includes a generally rectangular center portion 35 with a slot 40 formed in an end 42. The slot 40 is at least partially defined by a pair walls 44 that are angled towards a second end 48. As will be discussed in more detail herein, a portion of a two-dimensional scanner 50 is arranged between the walls 44. The walls 44 are angled to allow the scanner 50 to operate by emitting a light over a large angular area without interference from the walls 44. As will be discussed in more detail herein, the end 42 may further include a camera 60. The camera 60 may be an 2D RGB camera or a depth/RGBD camera.

In the exemplary embodiment, the second end 48 is defined by a semi-cylindrical surface 52 and a pair of side walls 54. In an embodiment, the side walls 54 include a plurality of exhaust vent openings 56. The exhaust vent openings 56 are fluidly coupled to intake vent openings 58 arranged on a bottom surface 62 of center portion 35. The intake vent openings 58 allow external air to enter a conduit 64 having an opposite opening 66 (FIG. 5) in fluid communication with the hollow interior 67 of the body 34. In an embodiment, the opening 66 is arranged adjacent to a controller 68 which has one or more processors that is operable to perform the methods described herein. In an embodiment, the external air flows from the opening 66 over or around the controller 68 and out the exhaust vent openings 56.

The controller 68 is coupled to a wall of body 34. In an embodiment, the wall is coupled to or integral with the handle 36. The controller 68 is electrically coupled to the 2D scanner 50, the camera 60, a power source 72, an inertial measurement unit (IMU) 74, a laser line projector 76, a haptic feedback device 77, and a wall sensor 79.

The wall sensor 79 extends the sensing capabilities of the system 30 by building maps of internal structures of buildings, such as pipes, wires, conduits, or any other internal elements that are present inside one or more walls in the environment being scanned. The wall sensor 79 is attached to the system 30 in a way that the wall sensor 79 points forward and does not interfere with the other scanning sensors of the system 30, such as the 2D scanner 50, the camera 60, and the like. The sensor 79 is coupled with the controller 68 in a wired manner, for example using a USB port, or any other such data communication port. Alternatively, or in addition, the sensor 79 may communicate with the controller 68 in a wireless manner, such as using BLUETOOTH™ or any other communication protocol. The sensor 79 (wall sensor) detects if a portion of the wall being scanned includes at least a portion of the internal element.

The sensor 79 detects the presence of the part of the internal element using one or more techniques such as sound waves, magnetic waves, light waves, or any other technique. In one or more examples, the sensor 79 detects presence of metal inside one or more portions of the wall. Alternatively, or in addition, the sensor 79 detects presence of non-metallic internal elements, such as plastic, rubber, silicon, Poly Vinyl Chloride (PVC), Chlorinated PVC, Cross-linked Polyethylene (PEX), or any other such material that may be used for manufacturing internal elements found inside walls, such as pipes, electric wires, data wires, other types of conduits and the like.

Figure 9:
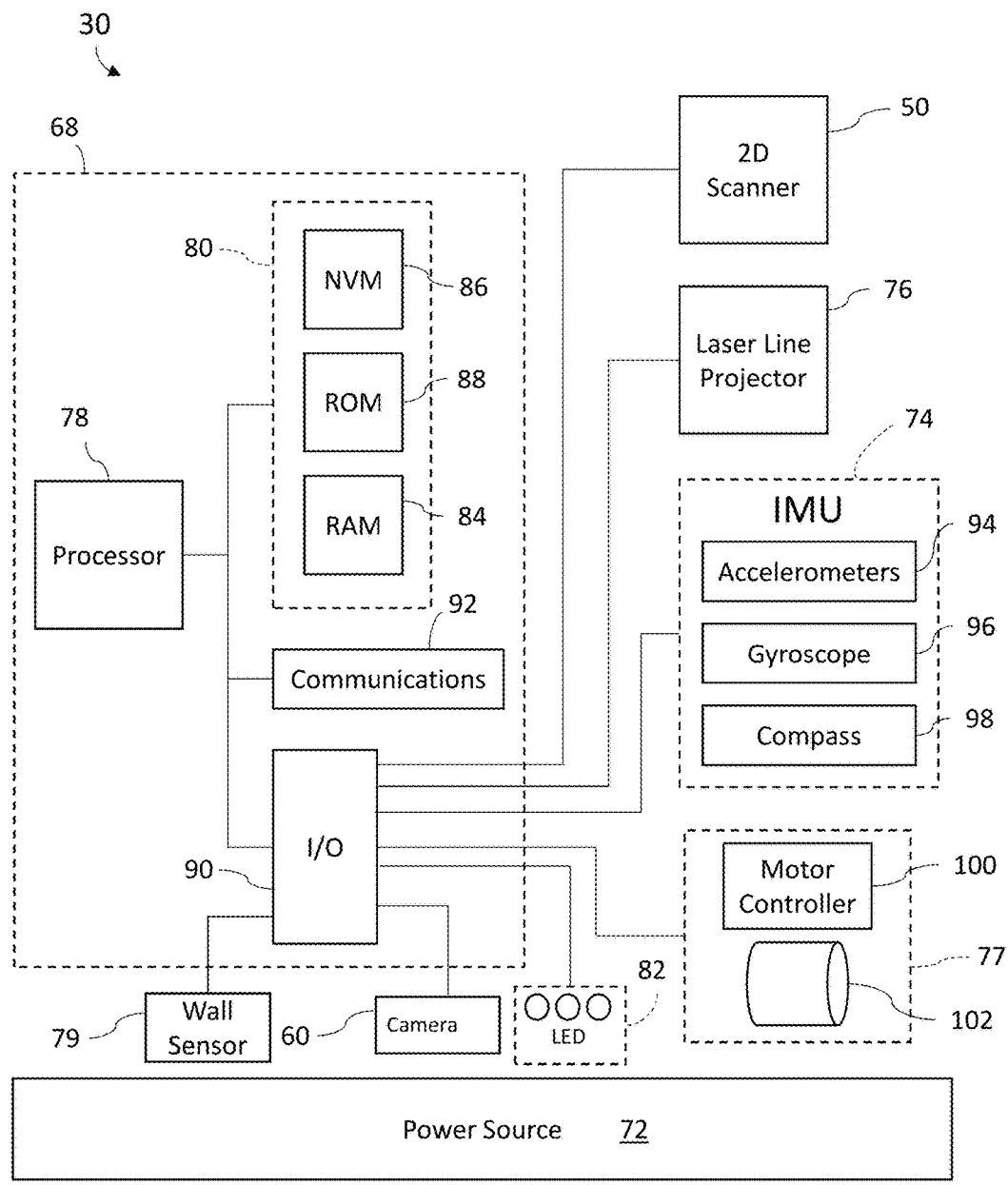
FIG. 9 is a schematic illustration of the system of FIG. 1 in accordance with an embodiment.

Referring now to FIG. 9 with continuing reference to FIGS. 1-8, elements are shown of the system 30. Controller 68 is a suitable electronic device capable of accepting data and instructions, executing the instructions to process the data, and presenting the results. The controller 68 includes one or more processing elements 78. The processors may be microprocessors, field programmable gate arrays (FPGAs), digital signal processors (DSPs), and generally any device capable of performing computing functions. The one or more processors 78 have access to memory 80 for storing information.

Controller 68 is capable of converting the analog voltage or current level provided by 2D scanner 50, camera 60 and IMU 74 into a digital signal to determine a distance from the system 30 to an object in the environment. Controller 68 uses the digital signals that act as input to various processes for controlling the system 30. The digital signals represent one or more system 30 data including but not limited to distance to an object, images of the environment, acceleration, pitch orientation, yaw orientation and roll orientation.

In general, controller 68 accepts data from 2D scanner 50 and IMU 74 and is given certain instructions for the purpose of generating a two-dimensional map of a scanned environment. Controller 68 provides operating signals to the 2D scanner 50, the camera 60, the laser line projector 76, the haptic feedback device 77, and the wall sensor 79. Controller 68 also accepts data from IMU 74, indicating, for example, whether the operator is operating in the system in the desired orientation. The controller 68 compares the operational parameters to predetermined variances (e.g. yaw, pitch or roll thresholds) and if the predetermined variance is exceeded, generates a signal that activates the haptic feedback device 77. The data received by the controller 68 may be displayed on a user interface coupled to controller 68. The user interface may be one or more LEDs (light-emitting diodes) 82, an LCD (liquid-crystal diode) display, a CRT (cathode ray tube) display, or the like. A keypad may also be coupled to the user interface for providing data input to controller 68. In one embodiment, the user interface is arranged or executed on a mobile computing device that is coupled for communication, such as via a wired or wireless communications medium (e.g. Ethernet, serial, USB, Bluetooth™ or WiFi) for example, to the system 30.

The controller 68 may also be coupled to external computer networks such as a local area network (LAN) and the Internet. A LAN interconnects one or more remote computers, which are configured to communicate with controller 68 using a well-known computer communications protocol such as TCP/IP (Transmission Control Protocol/Internet (^) Protocol), RS-232, ModBus, and the like. Additional systems 30 may also be connected to LAN with the controllers 68 in each of these systems 30 being configured to send and receive data to and from remote computers and other systems 30. The LAN may be connected to the Internet. This connection allows controller 68 to communicate with one or more remote computers connected to the Internet.

The processors 78 are coupled to memory 80. The memory 80 may include random access memory (RAM) device 84, a non-volatile memory (NVM) device 86, a read-only memory (ROM) device 88. In addition, the processors 78 may be connected to one or more input/output (I/O) controllers 90 and a communications circuit 92. In an embodiment, the communications circuit 92 provides an interface that allows wireless or wired communication with one or more external devices or networks, such as the LAN discussed above.

Figure 16:
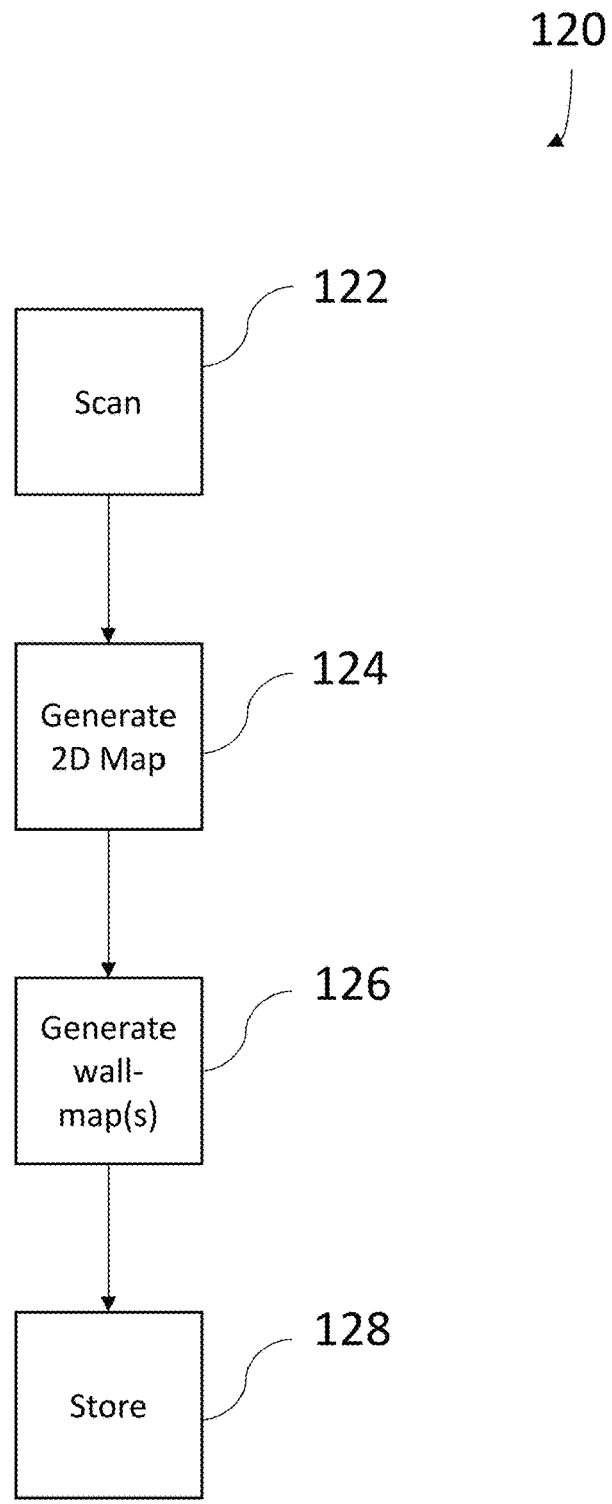
FIG. 16 is a flow diagram of a method of generating a two-dimensional map with wall maps in accordance with an embodiment.
Figure 22:
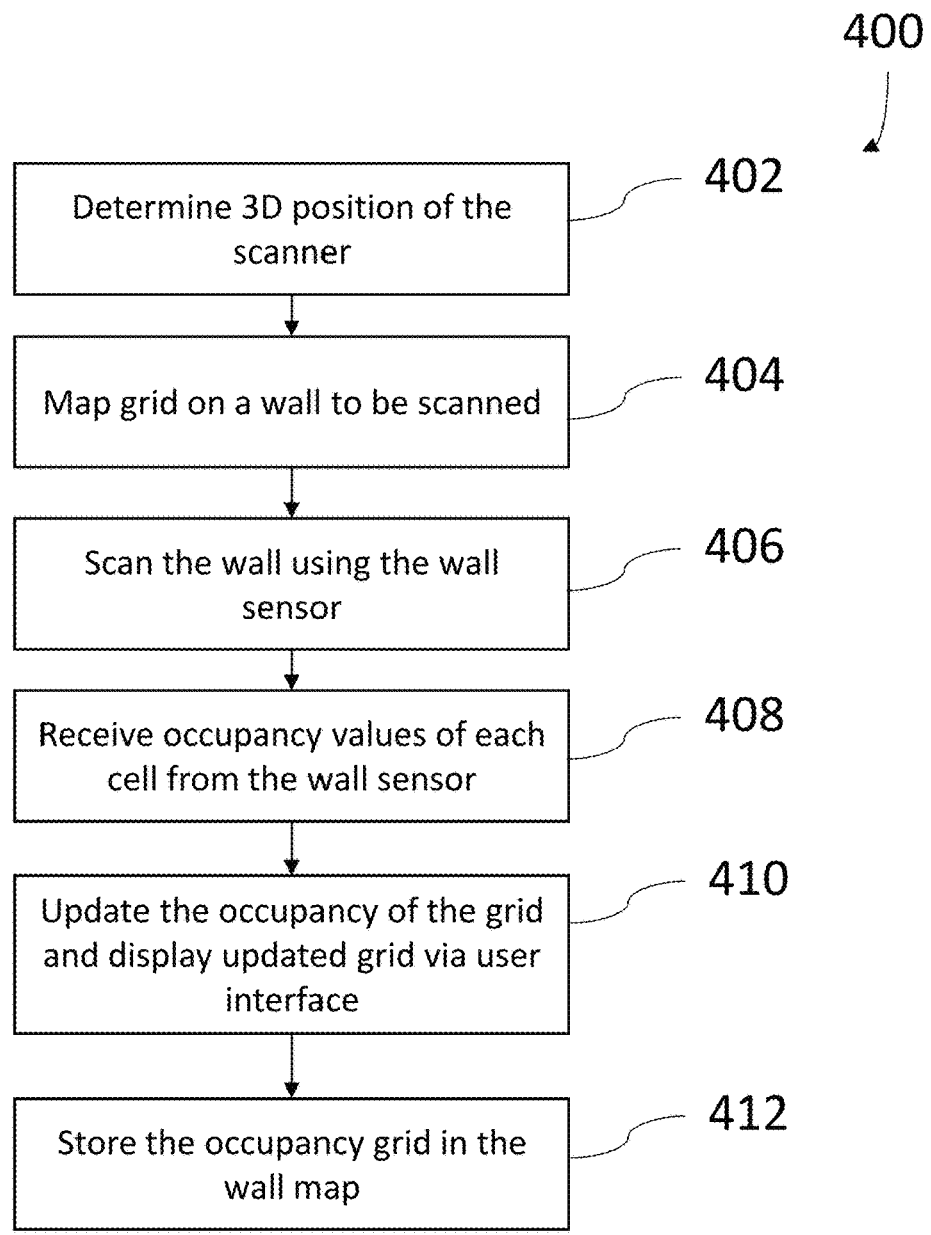
FIG. 22 is a flow diagram of a method of generating a wall map using according to one or more embodiments The detailed description explains embodiments of the invention, together with advantages and features, by way of example with reference to the drawings.

Controller 68 includes operation control methods embodied in application code shown in FIG. 16 and FIG. 22. These methods are embodied in computer instructions written to be executed by processors 78, typically in the form of software. The software can be encoded in any language, including, but not limited to, assembly language, VHDL (Verilog Hardware Description Language), VHSIC HDL (Very High Speed IC Hardware Description Language), Fortran (formula translation), C, C++, C#, Objective-C, Visual C++, Java, ALGOL (algorithmic language), BASIC (beginners all-purpose symbolic instruction code), visual BASIC, ActiveX, HTML (HyperText Markup Language), Python, Ruby and any combination or derivative of at least one of the foregoing.

Coupled to the controller 68 is the 2D scanner 50. The 2D scanner 50 measures 2D coordinates in a plane. In the exemplary embodiment, the scanning is performed by steering light within a plane to illuminate object points in the environment. The 2D scanner 50 collects the reflected (scattered) light from the object points to determine 2D coordinates of the object points in the 2D plane. In an embodiment, the 2D scanner 50 scans a spot of light over an angle while at the same time measuring an angle value and corresponding distance value to each of the illuminated object points.

Examples of 2D scanners 50 include, but are not limited to Model LMS100 scanners manufactured by Sick, Inc of Minneapolis, Minn. and scanner Models URG-04LX-UG01, UST-20LX, and UTM-30LX manufactured by Hokuyo Automatic Co., Ltd of Osaka, Japan. The scanners in the Sick LMS100 family measure angles over a 270 degree range and over distances up to 20 meters. The Hoyuko model URG-04LX-UG01 is a low-cost 2D scanner that measures angles over a 240 degree range and distances up to 4 meters. The Hoyuko model UTM-30LX is a 2D scanner that measures angles over a 270 degree range and to distances up to 30 meters. It should be appreciated that the above 2D scanners are exemplary and other types of 2D scanners are also available.

In an embodiment, the 2D scanner 50 is oriented so as to scan a beam of light over a range of angles in a generally horizontal plane (relative to the floor of the environment being scanned). At instants in time the 2D scanner 50 returns an angle reading and a corresponding distance reading to provide 2D coordinates of object points in the horizontal plane. In completing one scan over the full range of angles, the 2D scanner returns a collection of paired angle and distance readings. As the system 30 is moved from place to place, the 2D scanner 50 continues to return 2D coordinate values. These 2D coordinate values are used to locate the position of the system 30 thereby enabling the generation of a two-dimensional map or floorplan of the environment.

Also coupled to the controller 86 is the IMU 74. The IMU 74 is a position/orientation sensor that may include accelerometers 94 (inclinometers), gyroscopes 96, a magnetometers or compass 98, and altimeters. In the exemplary embodiment, the IMU 74 includes multiple accelerometers 94 and gyroscopes 96. The compass 98 indicates a heading based on changes in magnetic field direction relative to the earth's magnetic north. The IMU 74 may further have an altimeter that indicates altitude (height). An example of a widely used altimeter is a pressure sensor. By combining readings from a combination of position/orientation sensors with a fusion algorithm that may include a Kalman filter, relatively accurate position and orientation measurements can be obtained using relatively low-cost sensor devices. In the exemplary embodiment, the IMU 74 determines the pose or orientation of the system 30 about three-axis to allow a determination of a yaw, roll and pitch parameter.

In an embodiment, the system 30 further includes a 3D camera 60. Alternatively, or in addition, in an embodiment, the system 30 includes a 2D camera in combination with an IMU that tracks the 3D position of the system 30 by tracking environmental features. As used herein, the term 3D camera refers to a device that produces a two-dimensional image that includes distances to a point in the environment from the location of system 30. The 3D camera 30 may be a range camera or a stereo camera. In an embodiment, the 3D camera 30 includes an RGB-D sensor that combines color information with a per-pixel depth information. In an embodiment, the 3D camera 30 may include an infrared laser projector 31 (FIG. 8), a left infrared camera 33, a right infrared camera 39, and a color camera 37. In an embodiment, the 3D camera 60 is a RealSense™ camera model R200 manufactured by Intel Corporation.

In the exemplary embodiment, the system 30 is a handheld portable device that is sized and weighted to be carried by a single person during operation. Therefore, the plane 51 (FIG. 5) in which the 2D scanner 50 projects a light beam may not be horizontal relative to the floor or may continuously change as the computer moves during the scanning process. Thus, the signals generated by the accelerometers 94, gyroscopes 96 and compass 98 may be used to determine the pose (yaw, roll, tilt) of the system 30 and determine the orientation of the plane 51.

In an embodiment, it may be desired to maintain the pose of the system 30 (and thus the plane 51) within predetermined thresholds relative to the yaw, roll and pitch orientations of the system 30. In an embodiment, a haptic feedback device 77 is disposed within the housing 32, such as in the handle 36. The haptic feedback device 77 is a device that creates a force, vibration or motion that is felt or heard by the operator. The haptic feedback device 77 may be, but is not limited to: an eccentric rotating mass vibration motor or a linear resonant actuator for example. The haptic feedback device is used to alert the operator that the orientation of the light beam from 2D scanner 50 is equal to or beyond a predetermined threshold. In operation, when the IMU 74 measures an angle (yaw, roll, pitch or a combination thereof), the controller 68 transmits a signal to a motor controller 100 that activates a vibration motor 102. Since the vibration originates in the handle 36, the operator will be notified of the deviation in the orientation of the system 30. The vibration continues until the system 30 is oriented within the predetermined threshold or the operator releases the actuator 38. In an embodiment, it is desired for the plane 51 to be within 10-15 degrees of horizontal (relative to the ground) about the yaw, roll and pitch axes.

Figure 10:
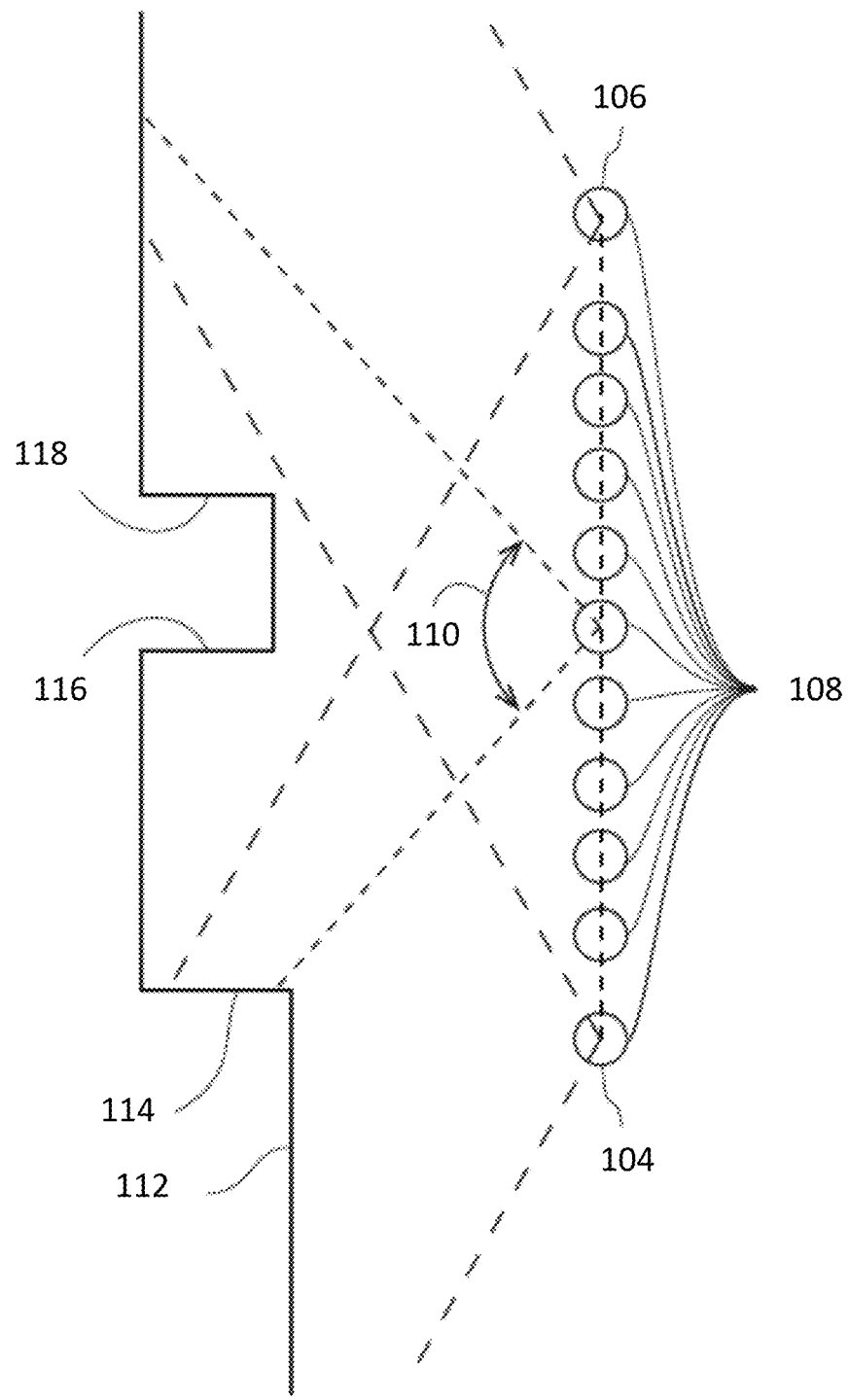
FIGS. 10-12 are plan views of stages of a two-dimensional map generated with the method of FIG. 10 in accordance with an embodiment.

In an embodiment, the 2D scanner 50 makes measurements as the system 30 is moved about an environment, such as from a first position 104 to a second registration position 106 as shown in FIG. 10. In an embodiment, 2D scan data is collected and processed as the system 30 passes through a plurality of 2D measuring positions 108. At each measuring position 108, the 2D scanner 50 collects 2D coordinate data over an effective FOV 110. Using methods described in more detail below, the controller 86 uses 2D scan data from the plurality of 2D scans at positions 108 to determine a position and orientation of the system 30 as it is moved about the environment. In an embodiment, the common coordinate system is represented by 2D Cartesian coordinates x, y and by an angle of rotation θ relative to the x or y axis. In an embodiment, the x and y axes lie in the plane of the 2D scanner and may be further based on a direction of a "front" of the 2D scanner 50.

Figure 11:
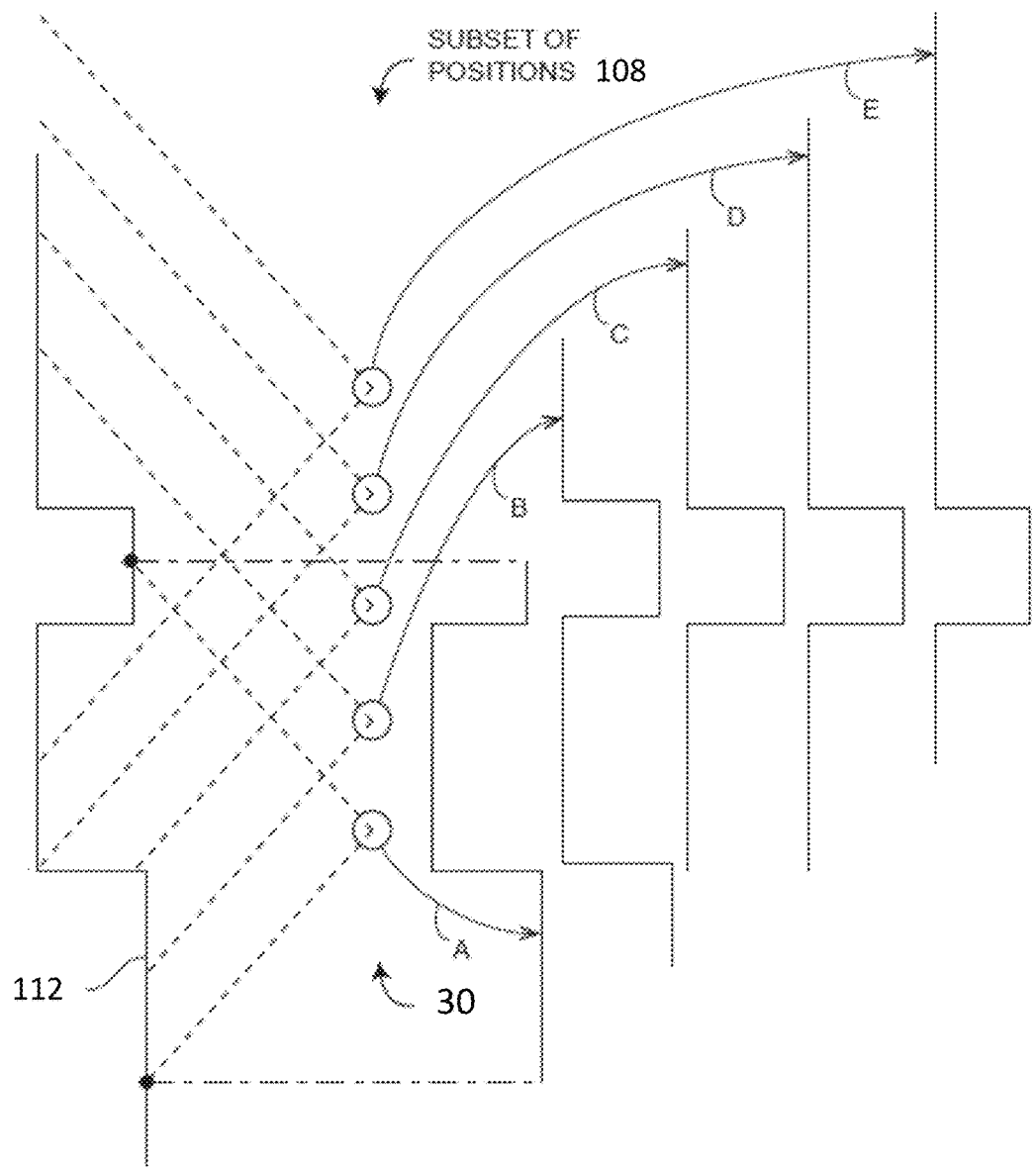

FIG. 11 shows the 2D system 30 collecting 2D scan data at selected positions 108 over an effective FOV 110. At different positions 108, the 2D scanner 50 captures a portion of the object 112 marked A, B, C, D, and E. FIG. 11 shows 2D scanner 50 moving in time relative to a fixed frame of reference of the object 112.

Figure 12:
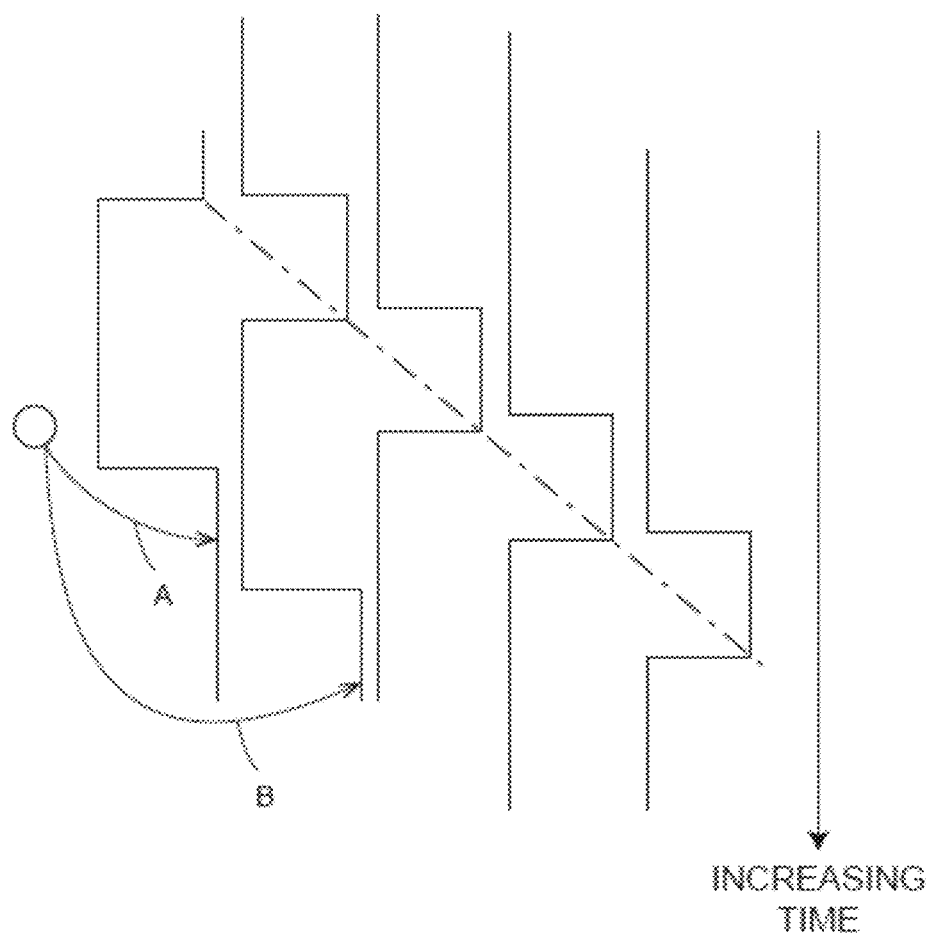

FIG. 12 includes the same information as FIG. 11 but shows it from the frame of reference of the system 30 rather than the frame of reference of the object 112. FIG. 12 illustrates that in the system 30 frame of reference, the position of features on the object change over time. Therefore, the distance traveled by the system 30 can be determined from the 2D scan data sent from the 2D scanner 50 to the controller 86.

As the 2D scanner 50 takes successive 2D readings and performs best-fit calculations, the controller 86 keeps track of the translation and rotation of the 2D scanner 50, which is the same as the translation and rotation of the system 30. In this way, the controller 86 is able to accurately determine the change in the values of x, y, θ as the system 30 moves from the first position 104 to the second position 106.

In an embodiment, the controller 86 is configured to determine a first translation value, a second translation value, along with first and second rotation values (yaw, roll, pitch) that, when applied to a combination of the first 2D scan data and second 2D scan data, results in transformed first 2D data that closely matches transformed second 2D data according to an objective mathematical criterion. In general, the translation and rotation may be applied to the first scan data, the second scan data, or to a combination of the two. For example, a translation applied to the first data set is equivalent to a negative of the translation applied to the second data set in the sense that both actions produce the same match in the transformed data sets. An example of an "objective mathematical criterion" is that of minimizing the sum of squared residual errors for those portions of the scan data determined to overlap. Another type of objective mathematical criterion may involve a matching of multiple features identified on the object. For example, such features might be the edge transitions 114, 116, and 118 shown in FIG. 10. The mathematical criterion may involve processing of the raw data provided by the 2D scanner 50 to the controller 86, or it may involve a first intermediate level of processing in which features are represented as a collection of line segments using methods that are known in the art, for example, methods based on the Iterative Closest Point (ICP). Such a method based on ICP is described in Censi, A., "An ICP variant using a point-to-line metric," IEEE International Conference on Robotics and Automation (ICRA) 2008, which is incorporated by reference herein.

In an embodiment, assuming that the plane 51 (FIG. 5) of the light beam from 2D scanner 50 remains horizontal relative to the ground plane, the first translation value is dx, the second translation value is dy, and the first rotation value dθ. If the first scan data is collected with the 2D scanner 50 having translational and rotational coordinates (in a reference coordinate system) of $(x_1, y_1, \theta_1)$, then when the second 2D scan data is collected at a second location the coordinates are given by $(x_2, y_2, \theta_2) = (x_1 + dx, y_1 + dy, \theta_1 + d\theta)$. In an embodiment, the controller 86 is further configured to determine a third translation value (for example, dz) and a second and third rotation values (for example, pitch and roll). The third translation value, second rotation value, and third rotation value may be determined based at least in part on readings from the IMU 74.

The 2D scanner 50 collects 2D scan data starting at the first position 104 and more 2D scan data at the second position 106. In some cases, these scans may suffice to determine the position and orientation of the system 30 at the second position 106 relative to the first position 104. In other cases, the two sets of 2D scan data are not sufficient to enable the controller 86 to accurately determine the first translation value, the second translation value, and the first rotation value. This problem may be avoided by collecting 2D scan data at intermediate scan positions 108. In an embodiment, the 2D scan data is collected and processed at regular intervals, for example, once per second. In this way, features in the environment are identified in successive 2D scans at positions 108. In an embodiment, when more than two 2D scans are obtained, the controller 86 may use the information from all the successive 2D scans in determining the translation and rotation values in moving from the first position 104 to the second position 106. In another embodiment, only the first and last scans in the final calculation, simply using the intermediate 2D scans to ensure proper correspondence of matching features. In most cases, accuracy of matching is improved by incorporating information from multiple successive 2D scans.

It should be appreciated that as the system 30 is moved beyond the second position 106, a two-dimensional image or map of the environment being scanned may be generated.

Figure 13:
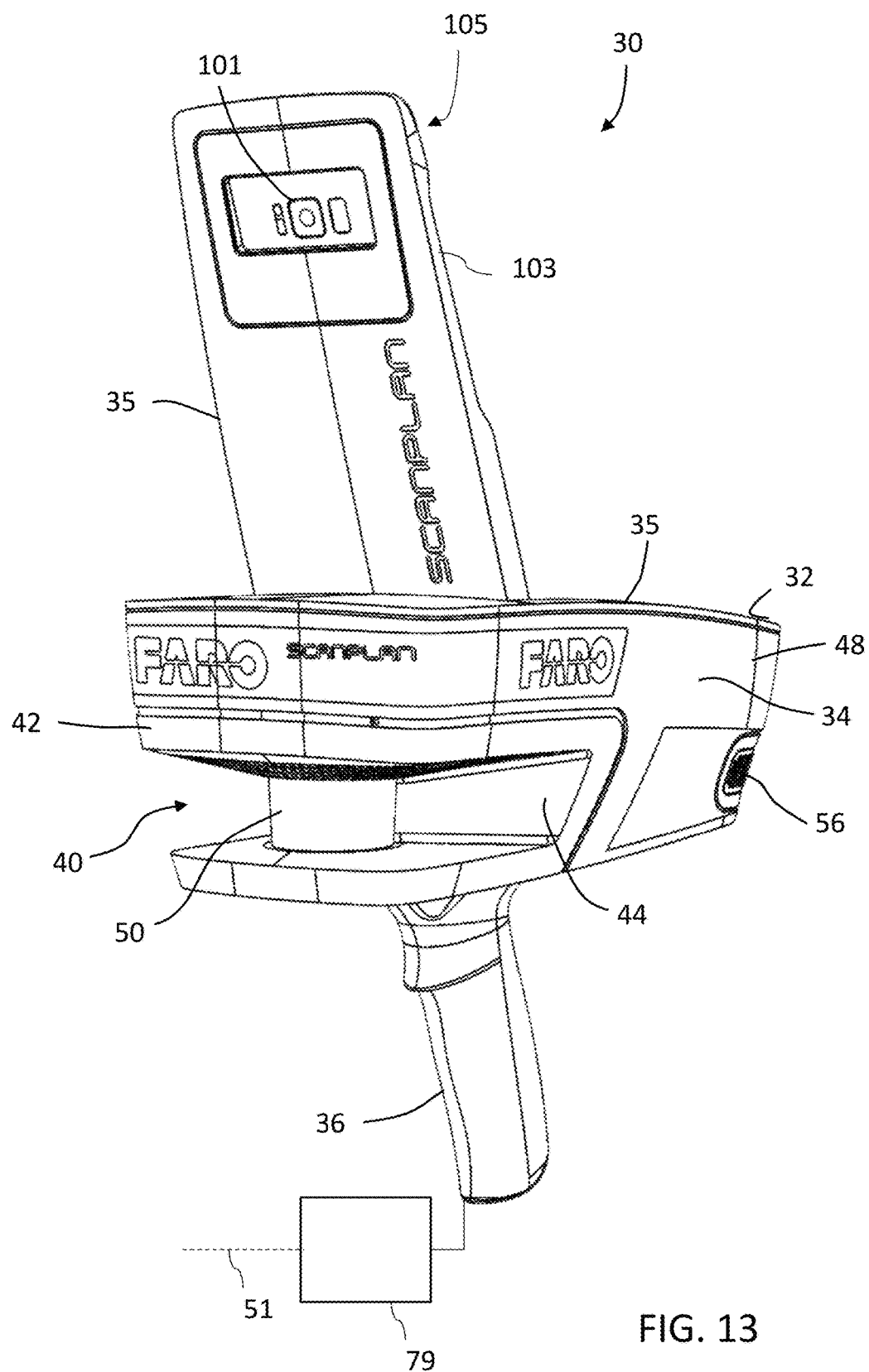
FIG. 13 depicts a system that generates a 2D map using augmented reality according to one or more embodiments.

FIG. 13 depicts the system 30 coupled with an image capture device for providing a user-interactivity according to one or more embodiments. In one or more examples, the image capture device 105 is a portable computing device such as a mobile phone, a tablet computer, a camera, a media device, or any other such electronic device. The image capture device 105 includes a camera 101 for capturing one or more images, which may be captured in a continuous, periodic or aperiodic manner. As used herein, the "continuous" capture of images refers to the acquisition of images at a predetermined or desired frame rate, such as 60 frames per second (fps) or 30 fps for example. In one embodiment, the frame rate may be user selectable. Further, the image capture device 105 includes a display device 103, such as a screen. Elements displayed on the display device 103 may be interacted with by the operator, for example via a touch screen, or any other input device. The image capture device 105 includes other components such as one or more processors, sensors, I/O devices, communications circuits (e.g. cellular, Ethernet, WiFi, BLUETOOTH™ and near-field) and the like, which are not shown.

The image capture device 105 is coupled with the system 30 using a mounting support 35. The mounting support 35 facilitates the image capture device 105 to be mounted in a stable position relative to the laser projector 31 in the system 30. In one or more examples, the relative position of the image capture device 105 and the system 30 is fixed and predetermined. In an embodiment, the position of the image capture device includes a linear spatial relationship (X, Y, Z) and the rotational or angular spatial relationship to the 2D scanner. The linear and angular relationship may also be referred to as the "pose" of the image capture device 105 to the 2D scanner. In one embodiment, the angular relationship of the image capture device 105 includes a predetermined angle relative to the plane 51.

The 2D scanner 50 continuously creates a 2D map of its environment as described herein using the incoming data from the laser range finder 31 and the IMU. The system 30 further facilitates the image capture device 105 to use its display 103 to visualize and interact with the 2D scanner 50. Further, the system 30 facilitates the operator to augment the 2D map of the environment using the image capture device 105. In one or more examples, the image capture device 105 and the 2D scanner communicate with each other via cable or wirelessly (e.g. BLUETOOTH™, WLAN™, etc.).

By having the image capture device 105 mounted in a stable position relative to the laser range finder 31 in the 2D scanner 50, the 2D laser data from the 2D scanner is calibrated with the position sensors on the image capture device 105, enabling the merging or fusion of the data coming from both, the 2D scanner 50 and the image capture device 105.

Figure 14:
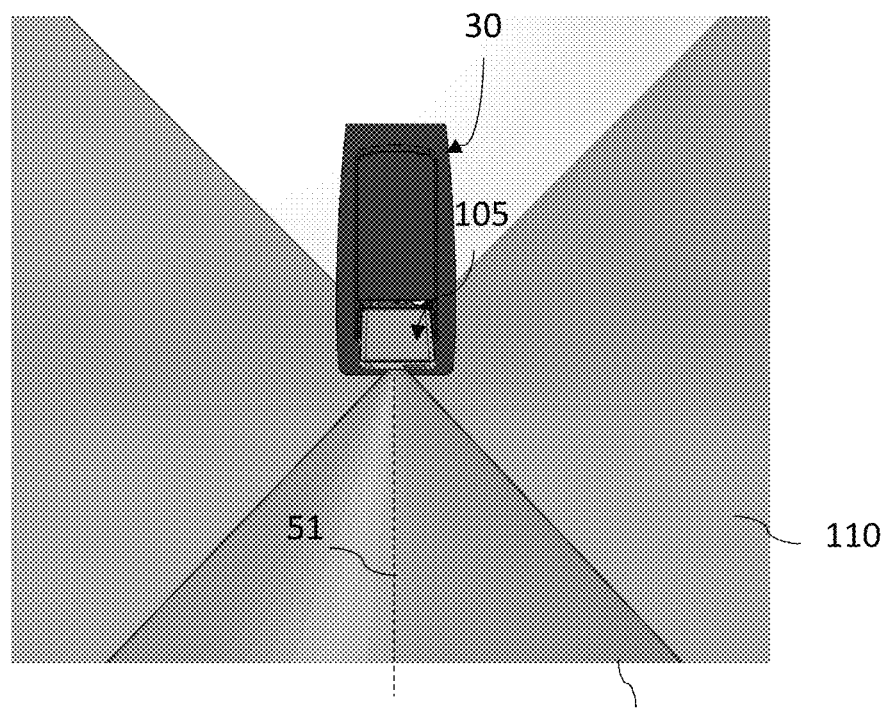
FIG. 14-15 depict field of views of an image capture system and a point scanner according to one or more embodiments.
Figure 15:
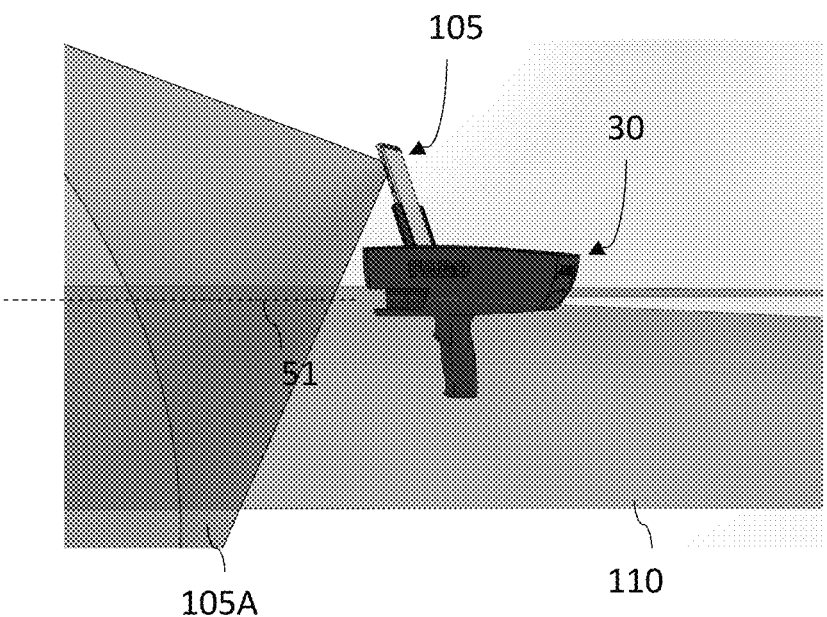

FIG. 14 and FIG. 15 depict overlapping FOVs of the 2D scanner and image capture device of the system according to one or more embodiments. The FOV 110 of the 2D scanner 50 overlaps with a FOV 105A of the image capture device 105. FIG. 14 depicts a top-view while FIG. 15 depicts a side-view of an example scenario with the overlapping FOVs 110 and 105A. Based on the relative position of the two devices, the system 30 calculates the coordinates of the laser readings from the laser projector 31 in the camera 101 coordinate system and vice versa. This calculation may be referred to as calibrating the image capture device 105 and the 2D scanner 50. The calibration is based on the relative position of the image capture device 105 and the scanner 50, including the angle at which the image capture device 105 is mounted with the scanner 50. The angle may be predetermined based on the mounting port provided by the scanner 50. Using the calibrated pair of devices, the system 30 facilitates the operator to interact with fused data generated from the data captured by each device, the 2D scanner 50 and the image capture device 105, independently. For example, the system provides augmented reality (AR) interactivity to the operator via the display 103 to facilitate the operator to interact with the point clouds captured by the 2D scanner 50 via a live stream of the visual capture from the image capture device 105. In one or more examples, the interactivity includes the operator augmenting the 2D map, for example with notes, images, and the like. Alternatively, or in addition, the interactivity may include identifying one or more shapes/objects in the 2D map by marking one or more boundaries within the stream captured by the image capture device 105. Further, the interactivity can include taking measurements of the one or more shapes/objects identified in the 2D map.

Figure 17:
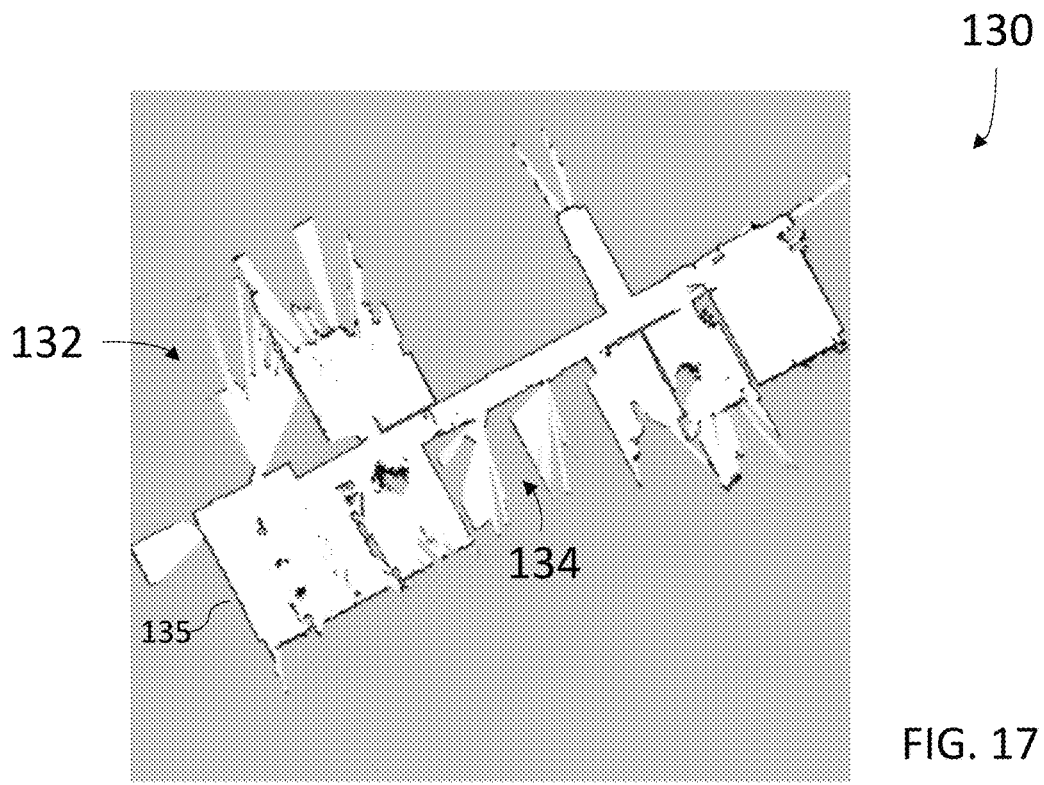
FIGS. 17-20 are views of annotated two-dimensional maps generated with the method of FIG. 16 in accordance with an embodiment.

Referring now to FIG. 16, a method 120 is shown for generating a two-dimensional map with wall-maps according to one or more embodiments. The method 120 starts in block 122 where the facility or area is scanned to acquire scan data 130, such as that shown in FIG. 17. The scanning is performed by carrying the system 30 through the area to be scanned. The system 30 measures distances from the system 30 to an object, such as a wall 135 for example, and also a pose of the system 30.

In an embodiment the user interacts with the system 30 via an actuator. The image capture device 105 provides the user interface that allows the operator to initiate the functions and control methods described herein. In an embodiment, the camera 101 continuously captures images simultaneously with the acquisition of the 2D data by the 2D scanner. Using the registration process described herein, the two dimensional locations of the measured points on the scanned objects (e.g. walls, doors, windows, cubicles, file cabinets etc.) may be determined. It is noted that the initial scan data may include artifacts, such as data that extends through a window 132 or an open door 134 for example. Therefore, the scan data 130 may include additional information that is not desired in a 2D map or layout of the scanned area.

Figure 18:
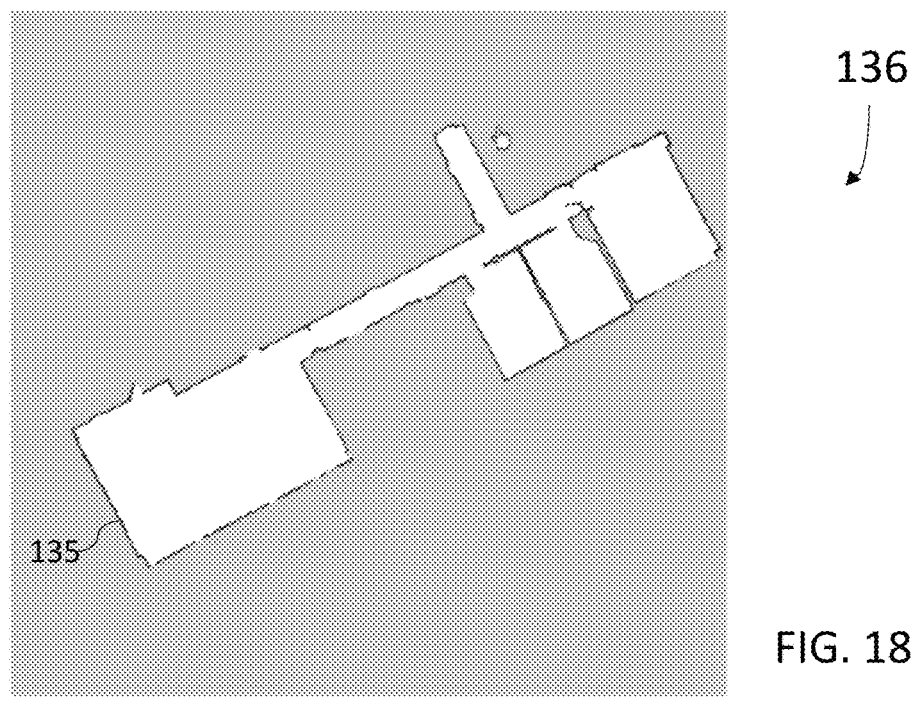
Figure 19:
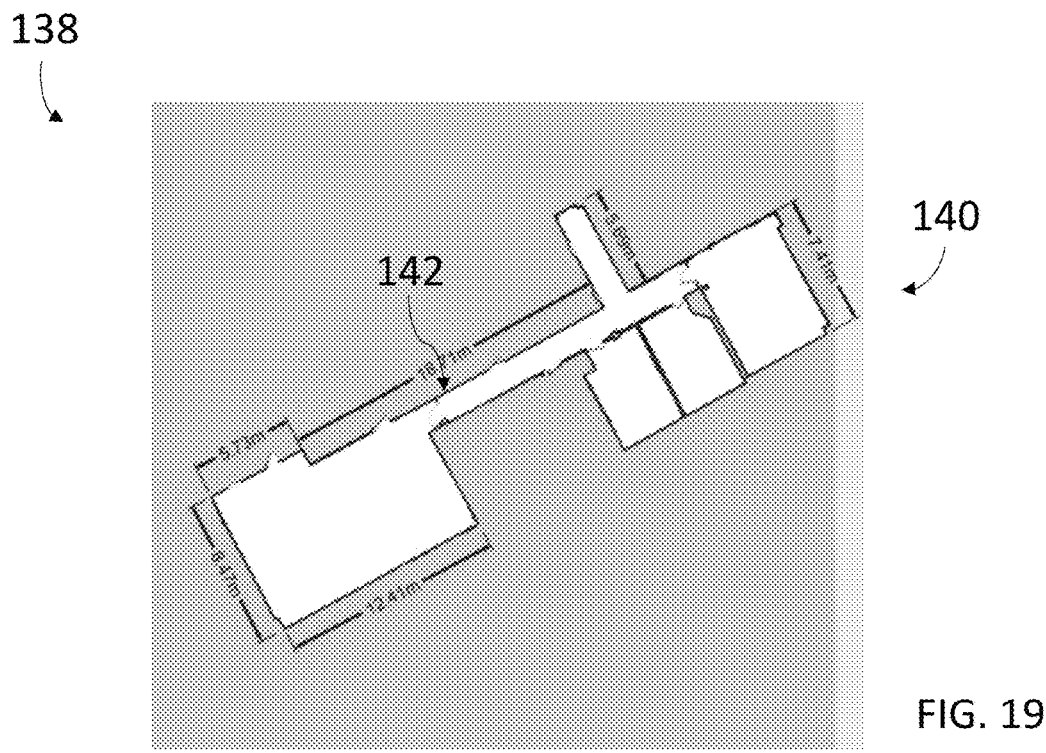
Figure 20:
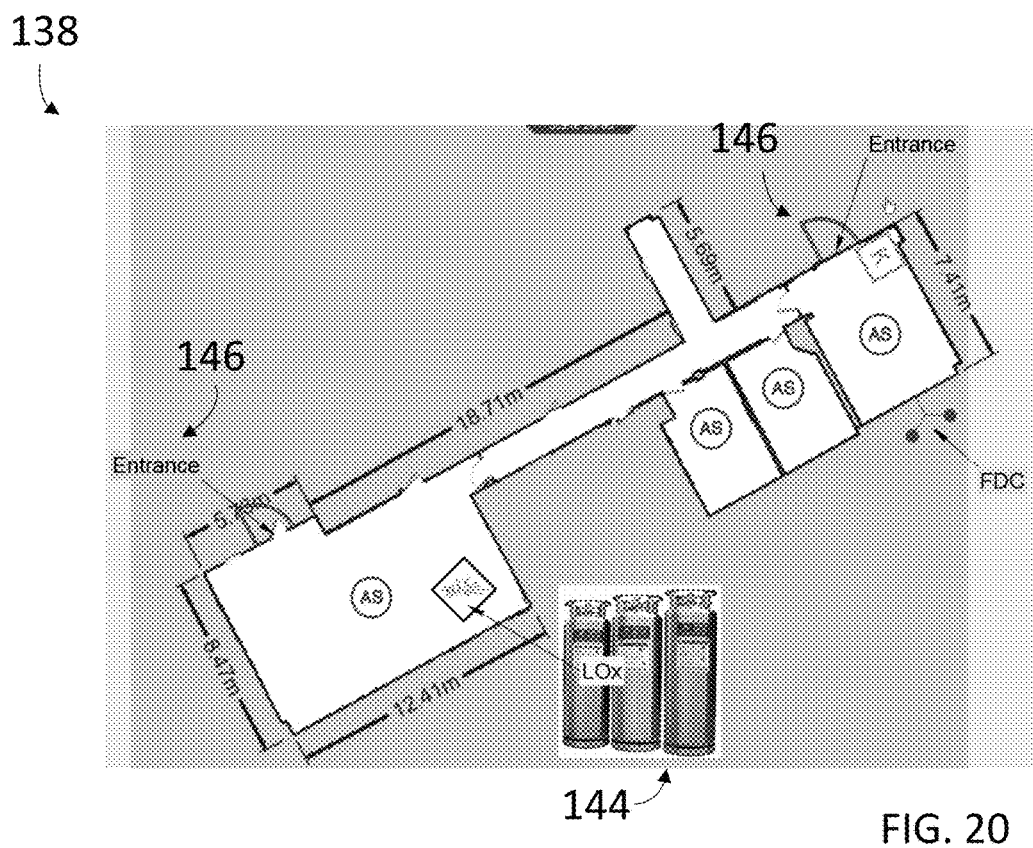

The method 120 then proceeds to block 124 where a 2D map 136 is generated of the scanned area as shown in FIG. 18. The generated 2D map 136 represents a scan of the area, such as in the form of a floor plan without the artifacts of the initial scan data. It should be appreciated that the 2D map 136 may be utilized directly by an architect, interior designer or construction contractor as it represents a dimensionally accurate representation of the scanned area. In one or more examples, generating the 2D map 136 includes annotating the 2D map 136 using user-defined annotations to define an annotated 2D map 138 (FIG. 19 and FIG. 20) that includes information, such as dimensions of features 140, the location of doors 142, the relative positions of objects (e.g. liquid oxygen tanks 144, entrances/exits or egresses 146 or other notable features such as but not limited to the location of automated sprinkler systems ("AS"), knox or key boxes ("K"), or fire department connection points ("FDC"). In some geographic regions, public safety services such as fire departments may keep records of building or facility layouts for use in case of an emergency as an aid to the public safety personnel in responding to an event. It should be appreciated that these annotations may be advantageous in alerting the public safety personnel to potential issues they may encounter when entering the facility, and also allow them to quickly locate egress locations.

It should be appreciated that while embodiments described herein may refer to the annotations as being defined after the scanning process is complete, this is for exemplary purposes and the claims should not be so limited. In other embodiments, the annotation data is defined by the operated during the scanning process, such as through a user input via display 103.

Figure 21:
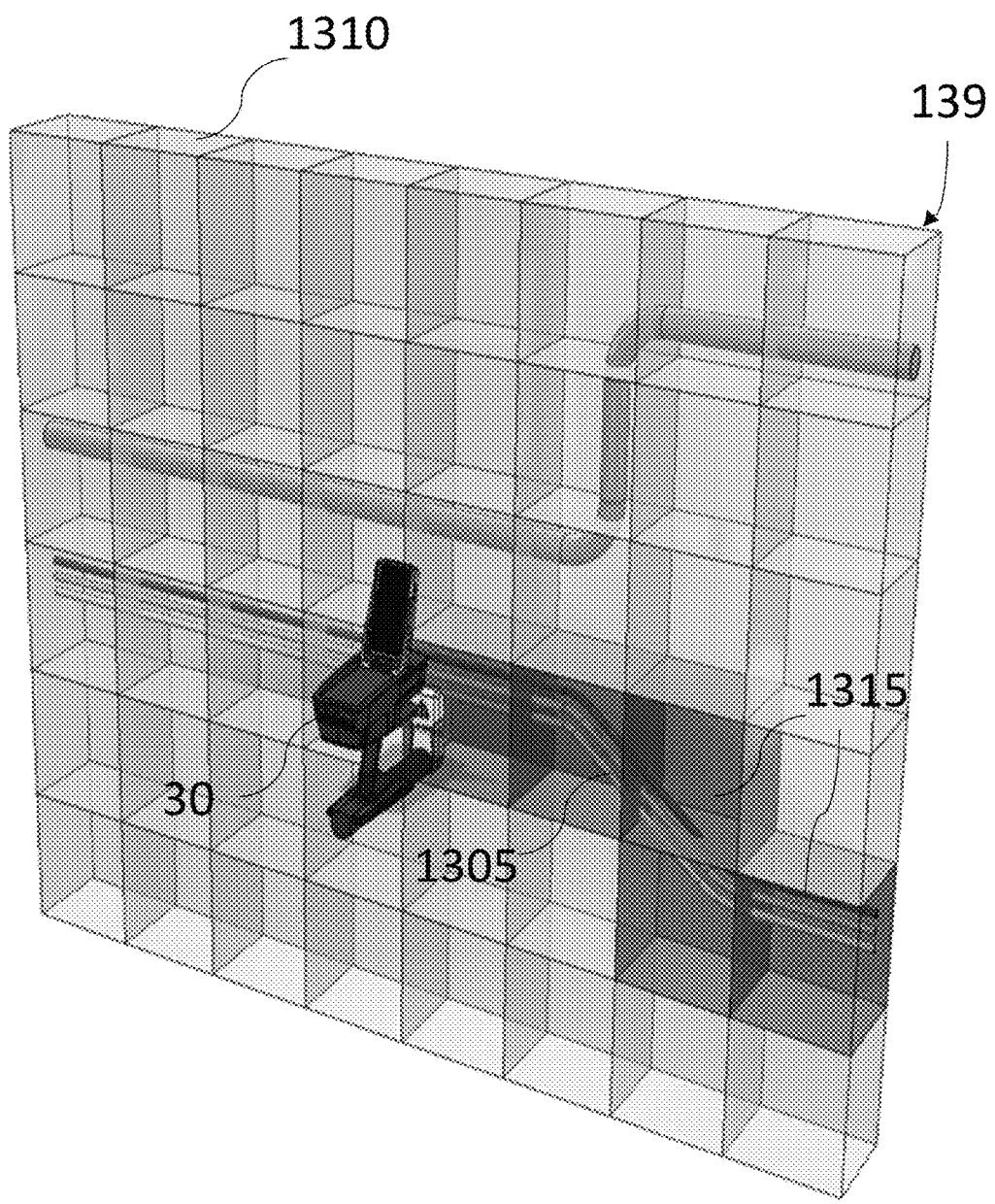
FIG. 21 depicts an example occupancy map or wall map according to one or more embodiments.

The method 120 further includes generating one or more wall-maps (FIG. 21) for the one or more walls 135 in the environment, at block 126. The wall-map 139, in one or more examples, is a vertical occupancy grid mapped with the wall 135 that is being scanned. It should be noted that the mapping is depicted for illustration purposes, and that the mapping may not be visually projected on the wall 135. Rather, the occupancy grid shown in FIG. 21 is a representation of an internal data structure of controller 68.

Mapping and generating the occupancy grid includes using the position where the measurement workflow is started as a 'starting position'. The system 30 creates the occupancy grid using a predetermined resolution. In one or more examples, the system 30 determines the resolution based on its 3D position. Every time the wall detector sensor gives a signal, the cell in the grid is marked as occupied. Alternatively, the system 30 uses a threshold, e.g. the sensor has to deliver a feedback 20 times, or any other number of times, before a grid cell is marked as occupied.

The user moves the scanner 30 in order to cover the entire wall 135 while maintaining the wall sensor 79 close to the wall 135 within at least a predetermined proximity In an embodiment, the predetermined distance between the wall and the sensor 79 is based on the type of sensor and its operating range. In an embodiment, the system 30 is kept at a distance of about 0.6 meters from the wall so that the pose and location tracking will be performed with a desired level of accuracy. The 3D pose estimation obtained from the combination of the scanner 30 with the device 105 facilitates in determining occupancy of a cell 1310 of the occupancy grid 139, which is based on the projection of the scanner pose on the wall plane. The wall scanner 79 identifies cells 1315 that are mapped and in which elements, such as pipes are detected. In one or more examples, the "occupied" cells 1315 are denoted using a color, pattern, or any other visual indication that is different from an "unoccupied" or "empty" cell 1310. It should be noted that the occupancy grid resolution in FIG. 21 is illustrative only, and that the grid resolution can be calibrated by the user based on how much accuracy is desired. For example, the grid resolution can be of an order of a centimeter, that is each cell is 1 cm×1 cm. In other examples, the grid resolution can be different.

The wall sensor 79 detects if a grid is occupied by detecting an element 1305 (or part thereof) such as a pipe, a wire conduit, or any other such element inside the wall 135. The wall sensor 79 can detect the elements inside the wall 135 using ultrasound, thermal imaging, radio waves, or any other such techniques. For example, the wall sensor 79 is a thermal imaging system that uses infrared sensing that detects if the element 1305 (or a part thereof) exists in each of the cells 1310 in the wall 135. The wall map 139 is stored and associated with the coordinates of the wall 135 and made accessible for a user to view via the user interface of the device 105, or any other user device.

In one or more examples, the grid 139 is stored as a matrix G, and each position G(i, j) is updated to indicate the occupancy of an element inside the wall 135. The number of positions in the matrix G are based on the resolution of the wall sensor 79.

It should be appreciated that since the grid 139 is associated with the wall 135 on the generated 2D map, the location of the elements 1305 may be displayed on the user interface 103 of the device 105, or any other suitable device that has received the generated 2D map. The display of the grid 139 or the cells 1315 on the user interface may be in the form of an augmented reality display. In other words, when the operator points the camera 101 at the wall 135, the cells 1315 will be displayed on the user interface 103 so that the operator may determine the locations of elements 1305.

FIG. 22 depicts a flowchart of an example method 400 for scanning inside a wall using a wall sensor according to one or more embodiments. The method 400 includes determining the 3D position coordinates of the scanner 30 at 402. The coordinates are determined by using the mapping techniques described herein using the laser scanner 76 and the one or more sensors of the device 105. The method 400 further includes mapping the grid 139 on the wall 135, at 404. Mapping the grid 139 includes determining dimensions of the wall 135 that is to be scanned and computing the cells that are to be mapped on the wall 135 based on the resolution of the wall sensor 79. In one or more examples, the grid 1310 is generated and mapped with the wall 135 in response to a user request via the user interface, such as via the device 105.

The method 400 further includes scanning the wall 135 to determine occupancy of the cells 1310 of the grid 139 using the wall sensor 79, at 406. The user moves the scanner 30 up and down to fully cover the entire wall 135. In one or more examples, the wall sensor 79 is held within a predetermined distance from the wall 135 in order to sense the elements, such pipes, inside the wall 135. The 3D pose of the scanner 30 is continuously tracked as the scanner 30 is being moved during the scan. The wall sensor 79 indicates, as an output to the processor 78, an occupancy of a cell 1310 against which the wall sensor 79 is presently positioned, at 408. The processor 78 marks the occupancy of the cells 1310 in the grid 139 mapped with the wall 135 and stores the occupancy values. In one or more examples, the occupancy of the grid 139 is updated and displayed in real time via the device 105 during the scan, at 410. For example, the cell 1315 that is determined as occupied is displayed using a first color and the cell 1310 that is determined to be unoccupied is displayed using a second color. In one or more examples, a cell that is still be scanned is displayed using a third color. It should be noted that the color is just one example attribute that may be varied among the different types of cells, and that in other examples, additional or different attributes are varied.

The method 400 further includes the processor 78 storing the occupancy information of the grid 1310, at 412. The stored occupancy grid 139 is associated with the wall 135 in the 2D map 138 that is stored. Accordingly, the occupancy of the inside of the wall 135 can be viewed offline after the scanning is completed as part of the map 138 for the environment. The method 400 can be repeated for any number of walls in the environment that is being scanned.

The wall map(s) thus generated can be saved as the annotations for the 2D map 138. Further, in one or more examples, the operator can further embellish the annotations, for example by adding more details, such as text/ images 111, changing the typeface, color, and other attributes of the occupancy grid.

Referring back to FIG. 16, once the wall map(s) are completed, the method 120 then proceeds to block 128 where the 2D annotated map 138 is stored in memory, such as nonvolatile memory 80 for example. The 2D annotated map 138 may also be stored in a network accessible storage device or server so that it may be accessed by the desired personnel. In response to the operator selecting the annotation at a later time when viewing the 2D map 138, the annotation is displayed with a pointer marking the selected position in the 2D map 138.

While embodiments herein describe the generation of the 2D map data after the scan is completed, this is for exemplary purposes and the claims should not be so limited. In other embodiments, the 2D map is generated during the scanning process as the 2D data is acquired.

It should be appreciated that the image or note annotations may be advantageous in embodiments where the annotated 2D map 166 is generated for inspection of existing environments with missing documentation, blueprints and the like. Detecting presence/absence of elements in this manner inside one or more walls of a building can facilitate determining improvements/changes to be made to the building, such as during damage repair, or constructing new structures. The technical solutions described herein can be further used during house inspections.

It should further be appreciated that while embodiments herein describe the 2D map as being generated by a system 30 having a 2D scanner 50 in conjunction with a 3D sensor, this is for exemplary purposes and the claims should not be so limited. In another embodiment, the system 30 comprises a mobile computing device, such as a cellular phone that facilitates 3D sensing capabilities for example to provide 3D positioning of the system 30. For example, visual tracking using the phone in conjunction with an IMU can be used for providing the 3D position. The 2D map is then merged with the 3D information to get a 3D position in the room. In an embodiment, the mobile computing device includes at least one camera 101 is a depth-camera such as an RGBD type camera which acquires depth information in addition to visual information on a per-pixel basis. The depth-camera data may be sent to the processor system through wired or wireless communication channels. As will be discussed in more detail herein, the camera 101 may be used to track the position and pose of the mobile computing device within the environment and generate a 3D map of the environment.

The depth camera that may include one of two types: a central-element depth camera and a triangulation-based depth camera. A central-element depth camera uses a single integrated sensor element combined with an illumination element to determine distance ("depth") and angles from the camera to points on an object. One type of central-element depth camera uses a lens combined with a semiconductor chip to measure round-trip time of light travelling from the camera to the object and back. For example, the Microsoft Xbox™ One manufactured by Microsoft Corporation of Redmond, Wash. includes a Kinect depth camera that uses an infrared (IR) light source to illuminate a 640×480 pixel photosensitive array. This depth camera is used in parallel with a 640×480 pixel RGB camera that measures red, blue, and green colors. Infrared illumination is provided in the IR illuminators adjacent to the lens and IR array. Another example of a central-element depth camera includes a lens and a Model PhotonICs 19k-S3 3D chip manufactured by PMD Technologies of Siegen, Germany may be used in conjunction with an IR light source. The measurement distance range of this 160×120 pixel chip is scalable based on the camera layout. Many other central-element depth cameras and associated IR sources are available today. Most central-element depth cameras include a modulated light source. The light source may use pulse modulation for direct determination of round-trip travel time. In another embodiment, the light source may use continuous wave (CW) modulation with sinusoidal or rectangular waveforms to obtain round-trip travel time based on measured phase shift.

The depth-camera may also be a triangulation-based depth camera. An example of such a camera is the Kinect™ of the Microsoft Xbox™ 360 manufactured by Microsoft Corporation of Redmond, Wash., which is a different Kinect™ than the Kinect™ of the Microsoft Xbox™ One described herein above. An IR light source on the Kinect™ of the Xbox™ 360 projects a pattern of light onto an object, which is imaged by an IR camera that includes a photosensitive array. The Kinect™ determines a correspondence between the projected pattern and the image received by the photosensitive array. It uses this information in a triangulation calculation to determine the distance to object points in the measurement volume. This calculation is based partly on the baseline between the projector and the IR camera and partly on the camera pattern received and projector pattern sent out. Unlike the central-element depth camera, a triangulation camera cannot be brought arbitrarily close to the light source (pattern projector) as accuracy is reduced with decreasing baseline distance.

In an embodiment, the mobile computing device includes a position/orientation sensor may include inclinometers (accelerometers), gyroscopes, magnetometers, and altimeters. Usually devices that include one or more of an inclinometer and gyroscope are referred to as an inertial measurement unit (IMU). In some cases, the term IMU is used in a broader sense to include a variety of additional devices that indicate position and/or orientation—for example, magnetometers that indicate heading based on changes in magnetic field direction relative to the earth's magnetic north and altimeters that indicate altitude (height). An example of a widely used altimeter is a pressure sensor. By combining readings from a combination of position/orientation sensors with a fusion algorithm that may include a Kalman filter, relatively accurate position and orientation measurements can be obtained using relatively low-cost sensor devices.

In an embodiment, the tracking and pose of the mobile computing device is performed using an augmented reality software library routine, such as the ARKit for iOS devices provided by Apple, Inc or the ARCore library for Android devices provided by Google, Inc. In an embodiment, the localization of the mobile device 30 in the environment may be performed using a localization processes. In an embodiment, the tracking is performed using a visual simultaneous localization and mapping process. Combining such information with the different sensors in the mobile device such as the IMU allows the mobile computing device to generate a 3D map (or a point cloud) of the environment. From this 3D map, a 2D map may be generated by projecting the 3D map onto a plane, such as a ground plane for example.

It should further be appreciated that the sensor 79 may be coupled to the mobile computing device in the same manner (e.g. a USB port) as the system 30. Thus, in an embodiment, the mobile computing device having a depth camera may generate the 2D map and the grid 139 (including the occupied cells 1315) without the additional 2D scanner 50. The elements within the wall may then be mapped as described herein using the sensor 79 combined with the pose and tracking information determined by the mobile computing device.

It should further be appreciated that the generation of a 2D map with the wall grid annotations may be generated asynchronously. For example, the 2D map may be generated at a first time period, and the grid 139 and the measurement of the wall with sensor 79 at a second time period that is different from the first time period. In an embodiment, the 2D map may be generated by a first device (e.g. system 30) and the measurement of the wall by a second device (e.g. a mobile computing device with a depth camera). In an embodiment, the 2D map is generated by the system 30, a mobile computing device then receives the 2D map and localizes the mobile computing device with the 2D map using the visual simultaneous localization and mapping process or using the ARKit or ARCore libraries. The mobile computing device then annotates the 2D map with the grid 139 and cells 1315. It should be appreciated that in other embodiments, the 2D map is generated by the mobile computing device and the wall is measured by the system 30.

The technical solutions described herein thus facilitate generating a two-dimensional (2D) image of an environment, the 2D image or map including a wall map for one or more walls in the environment. Generating the map includes obtaining, by a 2D scanner of a measurement device, a 2D scan set of 2D coordinates of points in the environment. Further, a processor maps an occupancy grid with a wall in the environment. The occupancy grid includes a plurality of cells that are mapped with corresponding portions of the wall. A wall sensor determines whether a portion of the wall includes an internal element, such as a pipe, a wire, or the like. The occupancy grid is then displayed with the cell corresponding to the portion being marked to indicate a presence of the internal element in the portion. Further, the 2D map of the environment is thus generated and stored using the 2D scan set and the occupancy grid. The occupancy grid displays the first cell using a first color and displays a second cell using a second color, the second cell corresponding to a second portion that is not occupied by the internal element that is occupancy. In other examples, the occupancy grid indicates the occupancy of the portions of the walls using different attributes of the cells, such as size, outline, brightness, and the like.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A system of generating a two-dimensional (2D) map of an environment, the system comprising:
   a housing having a body and a handle, the housing being sized to be carried by a single person during operation, the body having a first plane extending therethrough;
   a 2D scanner disposed in the body and having a light source, an image sensor and a controller, the light source steers a beam of light within the first plane to illuminate object points in the environment, the image sensor is arranged to receive light reflected from the object points, the controller being operable to determine a first distance value to at least one of the object points;
   a wall sensor positioned at a fixed position with respect to the 2D scanner, the wall sensor detects a presence of an internal element inside a wall in the environment; and
   one or more processors operably coupled to the 2D scanner and the wall sensor, the one or more processors being responsive to executable instructions for generating a 2D map of the environment, the one or more processors configured to:
   generate a wall map of the wall in the environment, the wall map comprising an occupancy grid with a plurality of cells, a cell representative of a corresponding portion of the wall, and the cell indicative of the occupancy of the internal element in the corresponding portion; and
   associate the wall map with a location of the wall in the 2D map of the environment.

2. The system of claim 1, wherein generating the wall map comprises computing the occupancy grid for the wall based on a dimension of the wall and a resolution of the wall sensor.

3. The system of claim 2, wherein the resolution of the wall sensor is calibrated dynamically.

4. The system of claim 1, further comprising:
   a display device configured to dynamically display the wall map, the displaying comprising, updating a visual appearance of the cell in response to the wall sensor detecting the presence of the internal element in the corresponding portion.

5. The system of claim 4, wherein updating the visual appearance comprises changing a color of the grid.

6. The system of claim 1, wherein the internal element is a conduit.

7. The system of claim 1, wherein the one or more processors are further configured to store the wall map as being associated with the wall in the 2D map.

8. The system of claim 1, further comprising an inertial measurement unit disposed in the housing and having a three-dimensional accelerometer and a three-dimension gyroscope, the inertial measurement unit monitors position and orientation of the system.

9. A method for generating a two-dimensional (2D) image of an environment, the method comprising:
   obtaining, a 2D scan set comprising 2D coordinates of points in the environment;
   mapping, by a processor, an occupancy grid with a wall in the environment, the occupancy grid comprising a plurality of cells that are mapped with corresponding portions of the wall;
   determining, by a wall sensor, a portion of the wall that includes an internal element;
   displaying, on a display device, the occupancy grid with the cell corresponding to the portion being marked to indicate a presence of the internal element in the portion; and
   generating a 2D map of the environment using the 2D scan set and the occupancy grid.

10. The method of claim 9, further comprising:
    computing the occupancy grid for the wall based on dimensions of the wall and a resolution of the wall sensor.

11. The method of claim 10, wherein the resolution of the wall sensor is calibrated dynamically.

12. The method of claim 9, wherein the display device is a mobile computing device.

13. The method of claim 9, wherein the internal element is a pipe that spans multiple portions of the wall.

14. The method of claim 9, further comprising:
    storing the occupancy grid as a wall map associated with the wall in the 2D map.

15. The method of claim 9, further comprising:
determining, by an inertial measurement unit, movement and orientation of the measurement device, which are used for generating the 2D image.

16. A system for generating a wall map for a wall in an environment, the system comprising one or more processors configured to:
receive, from a 2D scanner, a 2D scan set of a field of view of the system, the 2D scan set comprising 2D coordinates of points in the environment;
receive, from a portable computing device, images from the field of view;
receive, from a wall sensor, occupancy detection indicative of an internal element in one or more portions of the wall;
generate a wall map for the wall that comprises an occupancy grid, the occupancy grid comprising a plurality of cells that are mapped with corresponding portions of the wall, and a first cell from the occupancy grid indicates whether a corresponding first portion in the wall is occupied by at least a part of an internal element; and
generate a 2D map of the environment using the 2D scan set, the 2D map including the wall map associated with the wall.

17. The system of claim 16, wherein the one or more processors are further configured to:
map the plurality of cells from the occupancy grid with the corresponding portions of the wall.

18. The system of claim 17, wherein the occupancy grid for the wall is based on dimensions of the wall and a resolution of the wall sensor.

19. The system of claim 16, wherein the occupancy grid displays the first cell using a first color and displays a second cell using a second color, the second cell corresponding to a second portion that is not occupied by the internal element that is occupancy.

20. The system of claim 16, wherein the internal element is a pipe.

21. A system of generating a two-dimensional (2D) map of an environment, the system comprising:
a mobile computing device having a depth camera;
a wall sensor operably coupled to the mobile computing device and positioned at a fixed position with respect to the depth camera, the wall sensor detects a presence of an internal element inside a wall in the environment; and
one or more processors operably coupled to the mobile computing device and the wall sensor, the one or more processors being responsive to executable instructions for generating a 2D map of the environment, the one or more processors configured to:
generate a wall map of the wall in the environment, the wall map comprising an occupancy grid with a plurality of cells, a cell representative of a corresponding portion of the wall, and the cell indicative of the occupancy of the internal element in the corresponding portion; and
associate the wall map with a location of the wall in the 2D map of the environment.

22. The system of claim 21, wherein generating the wall map comprises computing the occupancy grid for the wall based on a dimension of the wall and a resolution of the wall sensor.

23. The system of claim 22, wherein the resolution of the wall sensor is calibrated dynamically.

24. The system of claim 21, wherein the mobile computing device further comprises a display device configured to dynamically display the wall map, the displaying comprising, updating a visual appearance of the cell in response to the wall sensor detecting the presence of the internal element in the corresponding portion.

25. The system of claim 24, wherein updating the visual appearance comprises changing a color of the grid.

26. The system of claim 21, wherein the internal element is a conduit.

27. The system of claim 21, wherein the one or more processors are further configured to store the wall map as being associated with the wall in the 2D map.

28. The system of claim 21, the mobile computing device further comprises an inertial measurement unit disposed in the housing and having a three-dimensional accelerometer and a three-dimension gyroscope, the inertial measurement unit monitors position and orientation of the system.

* * * * *